(12) United States Patent
Chiba et al.

(10) Patent No.: US 10,312,491 B2
(45) Date of Patent: Jun. 4, 2019

(54) SEPARATOR AND BATTERY

(75) Inventors: Kazuki Chiba, Fukushima (JP);
Atsushi Kajita, Fukushima (JP);
Yukako Teshima, Fukuoka (JP);
Masatake Hayashi, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 137 days.

(21) Appl. No.: 12/959,638

(22) Filed: Dec. 3, 2010

(65) Prior Publication Data

US 2011/0293976 A1 Dec. 1, 2011

(30) Foreign Application Priority Data

Dec. 4, 2009 (JP) ................. 2009-277071

(51) Int. Cl.
*H01M 2/16* (2006.01)
*H01M 4/00* (2006.01)
*H01M 2/18* (2006.01)
*H01M 2/28* (2006.01)
*H01M 10/04* (2006.01)
*B32B 15/085* (2006.01)
*B32B 1/08* (2006.01)
(Continued)

(52) U.S. Cl.
CPC ............ *H01M 2/1686* (2013.01); *B32B 1/08* (2013.01); *B32B 15/085* (2013.01); *H01M 2/166* (2013.01); *H01M 2/1653* (2013.01); *H01M 2/18* (2013.01); *H01M 2/28* (2013.01); *H01M 10/0431* (2013.01); *B32B 2250/40* (2013.01); *B32B 2255/10* (2013.01); *B32B 2255/26* (2013.01); *B32B 2307/50* (2013.01); *B32B 2307/724* (2013.01); *B32B 2457/10* (2013.01); *H01M 2/145* (2013.01); *H01M 10/0525* (2013.01)

(58) Field of Classification Search
CPC combination set(s) only.
See application file for complete search history.

(56) References Cited

U.S. PATENT DOCUMENTS

| 3,880,672 A | 4/1975 | Megahed et al. |
| 6,432,586 B1 | 8/2002 | Zhang |
| 6,677,083 B2 | 1/2004 | Suzuki et al. |

(Continued)

FOREIGN PATENT DOCUMENTS

| CN | 1384555 | 12/2002 |
| JP | 04-342954 | 11/1992 |

(Continued)

OTHER PUBLICATIONS

Japanese Office Action dated May 20, 2014 in corresponding Japanese Application No. 2010-270136.
(Continued)

*Primary Examiner* — Stephan J Essex
(74) *Attorney, Agent, or Firm* — K&L Gates LLP

(57) ABSTRACT

A separator includes a first layer that has a first principal face and a second principal face, and a second layer that is formed on at least one of the first principal face and the second principal face. The first layer is a microporous membrane including a first polymer resin, and the second layer is a microporous membrane including inorganic particles having an electrically insulating property and a second polymer resin.

24 Claims, 4 Drawing Sheets

(51) Int. Cl.
*H01M 2/14* (2006.01)
*H01M 10/0525* (2010.01)

(56) References Cited

U.S. PATENT DOCUMENTS

| | | | |
|---|---|---|---|
| 2001/0005560 A1 | 6/2001 | Yoshida et al. | |
| 2006/0199294 A1* | 9/2006 | Fujikawa | H01M 2/16 438/42 |
| 2007/0178384 A1* | 8/2007 | Kajita et al. | 429/251 |
| 2009/0011337 A1 | 4/2009 | Cacenco | |
| 2009/0092900 A1 | 4/2009 | Obana et al. | |
| 2009/0197158 A1 | 8/2009 | Ogawa et al. | |
| 2010/0099022 A1* | 4/2010 | Nishida et al. | 429/144 |
| 2010/0151325 A1 | 6/2010 | Kasamatsu et al. | |
| 2010/0178544 A1* | 7/2010 | Nishikawa | 429/129 |
| 2010/0304205 A1* | 12/2010 | Jo et al. | 429/144 |
| 2011/0052987 A1* | 3/2011 | Katayama | H01M 2/1646 429/221 |

FOREIGN PATENT DOCUMENTS

| | | |
|---|---|---|
| JP | 09-293537 | 11/1997 |
| JP | 2001-283811 | 10/2001 |
| JP | 2001-319634 | 11/2001 |
| JP | 2003-306594 | 10/2003 |
| JP | 2003-317695 | 11/2003 |
| JP | 2006-289657 | 10/2006 |
| JP | 2007-283273 | 11/2007 |
| JP | 2008-4536 | 1/2008 |
| JP | 2008-243805 | 10/2008 |
| JP | 2008-251433 | 10/2008 |
| JP | 2009-16279 | 1/2009 |
| JP | 2009-199793 | 3/2009 |
| JP | 2009-087562 | 4/2009 |
| JP | 2009-87889 | 4/2009 |
| JP | WO 2009044741 A1 * | 4/2009 ......... H01M 2/1646 |
| JP | 2009-187702 | 8/2009 |
| JP | 2009-259662 | 11/2009 |
| JP | 2009-272991 | 11/2009 |
| WO | 2000-079617 | 12/2000 |
| WO | 2006-134763 | 5/2006 |
| WO | WO 2007032450 A1 * | 3/2007 |
| WO | WO 2008018657 A1 * | 2/2008 |
| WO | WO 2008105555 A1 * | 9/2008 |
| WO | 2008/134503 | 11/2008 |
| WO | 2008/149895 | 12/2008 |
| WO | 2008/156033 | 12/2008 |
| WO | WO 2008149895 A1 * | 12/2008 |
| WO | 2009/044741 | 4/2009 |

OTHER PUBLICATIONS

Chinese Office Action dated Mar. 5, 2014 in corresponding Chinese Patent Application No. 201010575693.9.
Japanese Office Action dated Oct. 18, 2016 in corresponding Japanese Application No. 2015167831.
Japanese Office Action dated Apr. 12, 2016 in corresponding Japanese Application No. 2015-167831.
Korean Office Action dated May 24, 2016 in corresponding Korean Application No. 10-2010-0122560.
Product Databook, Sumitomo Chemical, Dec. 2015, Eng.Ed.1.
Chinese Office Action dated May 4, 2017 in corresponding Chinese Application No. 201510992753.X.
Chinese Office Action dated Dec. 23, 2014 in corresponding Chinese Application No. 201010575693.9.
Japanese Office Action dated Jan. 20, 2015 in corresponding Japanese Application No. 2010-270136.
Chinese Office Action dated Oct. 9, 2017 in corresponding Chinese Application No. 201510992753.X.
Japanese Office Action dated Nov. 14, 2017 in corresponding Japanese Application No. 2017-005775.

* cited by examiner

SEPARATOR AND BATTERY

CROSS REFERENCES TO RELATED APPLICATIONS

The present application claims priority to Japanese Priority Patent Application JP 2009-277071 filed in the Japan Patent Office on Dec. 4, 2009, the entire contents of which is hereby incorporated by reference.

BACKGROUND

The present application relates to a separator and a battery including the separator, and more particularly, to a lamination-type separator.

Owing to the noticeable recent development of mobile electronic technology, electronic apparatuses such as cellular phones and notebook computers are recognized as basic technologies that support an advanced information society. Research and development in implementing a high level of functionality of such electronic apparatuses has been vigorously advanced, and the power consumption of these electronic apparatuses has increased in proportion thereto. On the other hand, long-term driving force is necessary for these electronic apparatuses. Accordingly, implementation of a high energy density of a secondary battery that is a driving power source thereof is necessarily desired. In addition, from the viewpoint of the volume occupied, the mass, and the like of a battery built into these electronic apparatuses, it is desirable that the energy density of the battery is as high as it possibly can be. Accordingly, currently, lithium-ion secondary batteries with a superior energy density are built into most apparatuses.

In the lithium-ion secondary battery, by opposing a positive electrode and a negative electrode through a separator, both safety and battery capability are implemented. However, considering the implementation of high capacity and high safety, in the related art it is difficult to obtain sufficient capability only by using a polyolefin microporous membrane. In other words, in a battery in which high capacity is implemented in accordance with an increase in the functionality of the electronic apparatus, the thickness of an electrode layer is increased. Accordingly, the expansion of the negative electrode increases at the time of the charging process. At this time, pressure is applied to the inside of a cell, the pores of the separator are crushed so as to decrease ion permeability. Therefore, in a case where compression resistance is low, it is difficult to obtain adequate battery characteristics.

Meanwhile, for example as in JP-A-2008-4536, there is disclosed the technology of employing a separator that has a dynamic hardness DH of 1000 or higher at a time when the indenter load reaches 12 kgf/cm$^2$ in the composite membrane that is acquired by forming a coating layer formed from a polymer porous body having heat resistance on at least one face of a polyolefin microporous membrane.

SUMMARY

As the thickness of the negative electrode mixture increases in accordance with the increase in capacity, the pressure applied to the inside of the battery further increases. However, in JP-A-2008-4536, it has not been checked whether the separator maintains its pores in the state in which a load of the separator is equal to or greater than 12 kgf/cm2.

Thus, it is desirable to provide a separator that can maintain the pores of the separator even in a case where expansion of the electrode occurs in accordance with charging/discharging and a battery including this separator.

According to an, there is provided a separator including: a first layer that has a first principal face and a second principal face; and a second layer that is formed on at least one of the first principal face and the second principal face. The first layer is a microporous membrane including a polymer resin, and the second layer is a microporous membrane including inorganic particles having an electrically insulating property and a polymer resin.

According to another, there is provided a battery including: a positive electrode; a negative electrode; an electrolyte; and a separator. The separator includes a first layer that has a first principal face and a second principal face and a second layer that is formed on at least one of the first principal face and the second principal face. The first layer is a microporous membrane including a polymer resin, and the second layer is a microporous membrane including inorganic particles having an electrically insulating property and a polymer resin.

In the above-described separator, it is preferable that a difference between air permeability of the separator and air permeability of the first layer is equal to or less than 60 sec/100 ml, and an air-permeability rising rate of air permeability at a time when pressure is applied to the separator for two minutes at 60° C. under 50 kgf/cm$^2$ with respect to air permeability before the pressure load is equal to or lower than 35%. In order to implement this kind of separator, it is preferable that an average particle diameter D20 of the inorganic particles is larger than an average pore diameter of the pores opening onto a surface of the first layer, and the average pore diameter of the pores opening onto the surface of the first layer is equal to or greater than 0.03 μm and equal to or less than 2.00 μm.

According to an embodiment, the pressure resistance is improved, and the inorganic particles are not allowed to break into the pores formed on the surface of the first layer. Accordingly, it is difficult to crush the pores of the first layer of the separator. Therefore, both high ion permeability and high pressure resistance can be achieved.

According to an embodiment, the separator that can implement both pressure resistance and ion permeability can be achieved. Therefore, a battery that has a high degree of safety and superior battery characteristics can be achieved.

Additional features and advantages are described herein, and will be apparent from the following Detailed Description and the figures.

DETAILED DESCRIPTION

Embodiments of the present application will be described below in detail with reference to the drawings.

(1) First Embodiment (Example of Cylinder-Type Battery)
(2) Second Embodiment (Example of Flat-Type Battery)

1. First Embodiment

Configuration of Battery

Figure 1:
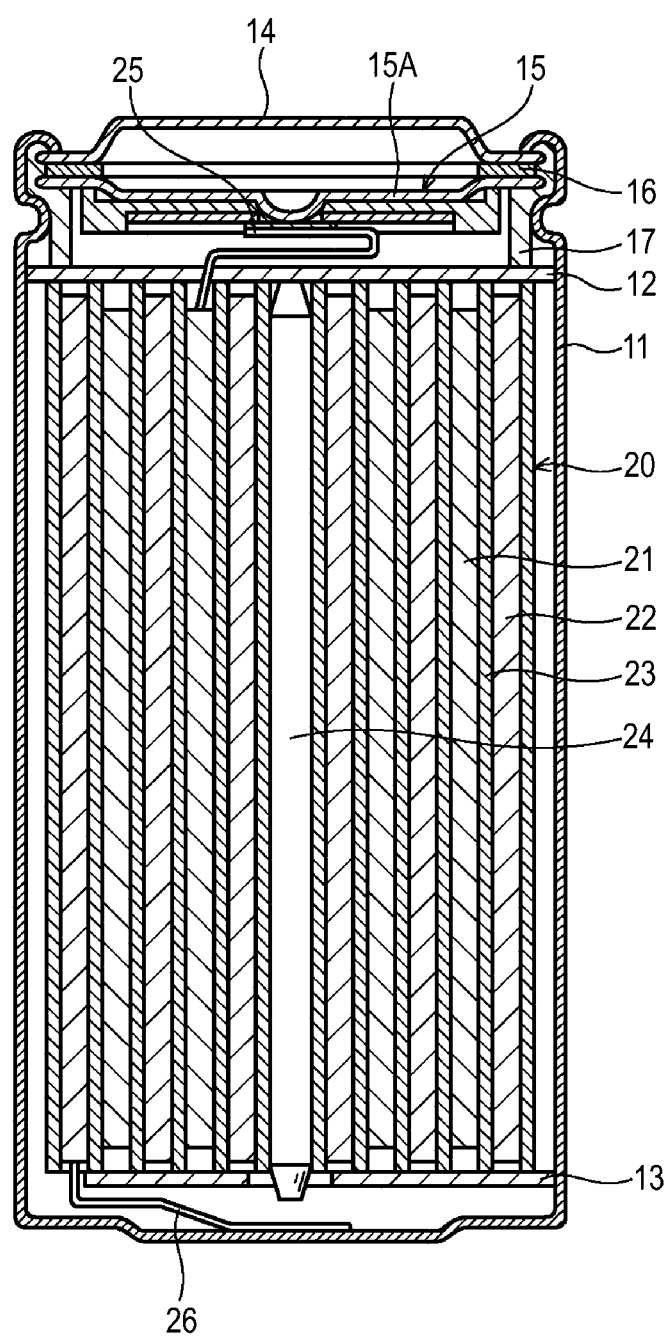
FIG. 1 is a cross-sectional view representing a configuration example of a nonaqueous electrolyte secondary battery according to a first.

FIG. 1 is a cross-sectional view representing a configuration example of a nonaqueous electrolyte secondary battery according to the first. This nonaqueous electrolyte secondary battery is a so-called a lithium ion secondary battery in which the capacity of a negative electrode is represented by a capacitance component according to intercalation or release of lithium (Li) that is an electrode reaction material. The nonaqueous electrolyte secondary battery is of a so-called cylinder type and has a wound electrode body 20 in which one pair of strip-shaped positive electrodes 21 and a strip-shaped negative electrode 22 are stacked and wound with separators 23 interleaved therebetween inside a battery can 11 having a substantially hollow column shape. The wound electrode body 20 is in a state where the separator 23, the negative electrode 22, the separator 23 and the positive electrode 21 are stacked in this order and wound, and the end of the separator 23 in the outer side is exposed on the periphery of the wound electrode body 20 and faces the inner wall of the battery can 11.

The battery can 11 is composed of iron (Fe) plated with nickel (Ni). One end of the battery can 11 is closed, and the other end thereof is open. Inside the battery can 11, an electrolytic solution is injected so that the separator 23 is impregnated with the electrolytic solution. In addition, one pair of insulating plates 12 and 13 is disposed perpendicular to the winding peripheral face so as to interpose the wound electrode body 20 therebetween.

In the open end of the battery can 11, a battery cover 14 and a safety valve mechanism 15 and a positive temperature coefficient device (PTC device) 16 disposed inside the battery cover 14 are installed upon being caulked through a sealing gasket 17. Accordingly, the inside of the battery can 11 is hermetically sealed. The battery cover 14 is composed of, for example, a material that is the same as that of the battery can 11. The safety valve mechanism 15 is electrically connected to the battery cover 14. Thus, when internal pressure of the battery reaches a predetermined or higher level due to an internal short circuit, heating from the exterior, or the like, a disk plate 15A is reversed, thereby cutting off the electrical connection between the battery cover 14 and the wound electrode body 20. The sealing gasket 17 is composed of, for example, an insulating material, and the surface thereof is coated with asphalt.

For example, a center pin 24 is inserted in the center of the wound electrode body 20. A positive electrode lead 25 made of aluminum (Al) or the like is connected to the positive electrode 21 of the wound electrode body 20; and a negative electrode lead 26 made of nickel or the like is connected to the negative electrode 22 of the wound electrode body 20. The positive electrode lead 25 extends from the wound electrode body 20 with one end thereof being fixed to the end of the positive electrode 21 in the wound center side while the other end thereof is welded to the safety valve mechanism 15, whereby the positive electrode lead 25 is electrically connected to the battery cover 14; and the negative electrode lead 26 extends from the wound electrode body 20 with one end thereof being fixed to the end of the negative electrode 22 in the outer side while the other end thereof is welded to the battery can 11, whereby the negative electrode lead 26 is electrically connected to the battery can 11.

Figure 2:
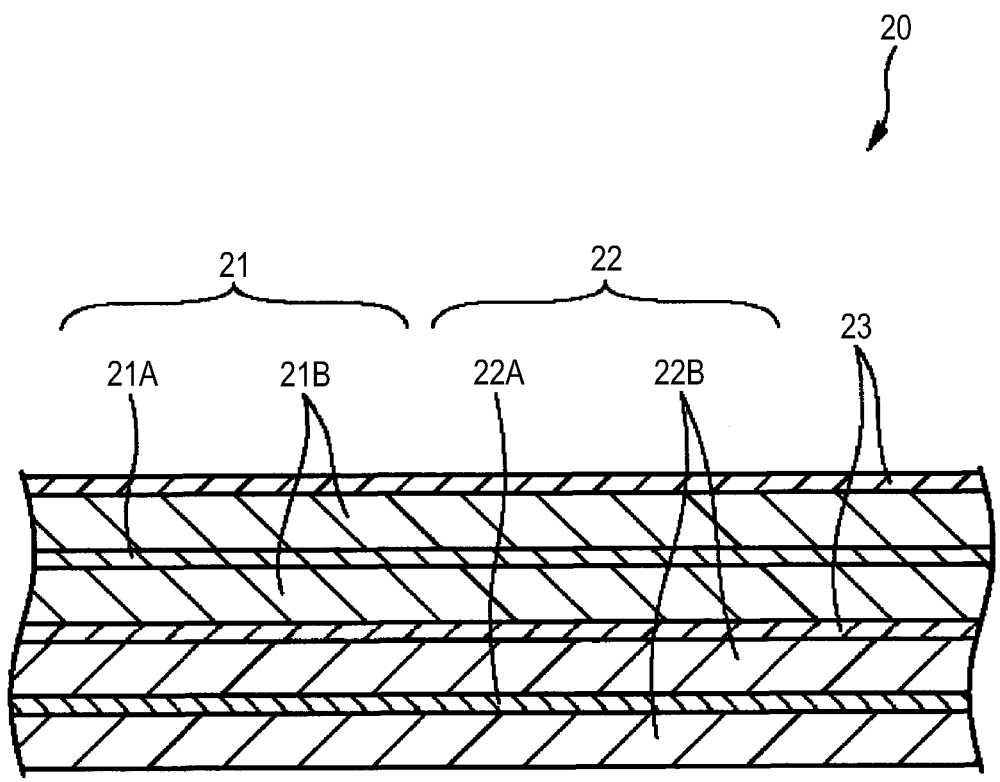
FIG. 2 is an enlarged cross-sectional view of a part of a wound electrode body shown in FIG. 1.
Figure 3:
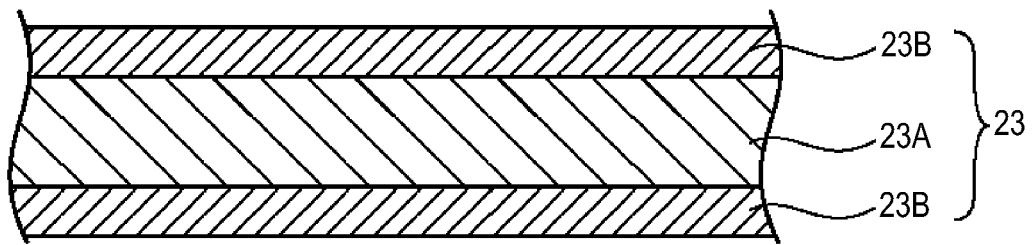
FIG. 3 is a cross-sectional view representing a configuration example of a separator according to the first.

FIG. 2 is an enlarged cross-sectional view of a part of the wound electrode body 20 shown in FIG. 1. FIG. 3 is a cross-sectional view representing a configuration example of the separator. Hereinafter, the positive electrode 21, the negative electrode 22, the separator 23, and the electrolytic solution configuring a secondary battery according to an will be sequentially described with reference to FIGS. 2 and 3.

Positive Electrode

The positive electrode 21 has a structure in which, for example, positive electrode active material layers 21B are disposed on the both sides of a positive electrode collector 21A. Although not shown in the figure, the positive electrode active material layer 21B may be disposed on only one side of the positive electrode collector 21A. The positive electrode collector 21A is formed of a metal foil such as an aluminum foil. The positive electrode active material layers 21B are disposed on the positive electrode collector 21A except for both ends of the positive electrode collector 21A. The positive electrode lead 25 is connected to the positive electrode collector 21A of the positive electrode 21 in a portion where the positive electrode active material layer 21B is not disposed and the positive electrode collector 21A is exposed.

The positive electrode active material layer 21B is composed so as to contain, for example, one or two or more types of materials composing the positive electrode capable of intercalating and releasing lithium as a positive electrode active material. As necessary, the positive electrode active material layer 21B is composed so as to contain a conductive material such as graphite and a binder such as polyvinylidene fluoride.

As a material composing the positive electrode that is capable of intercalating and releasing lithium, for example, a lithium-containing compound such as a lithium oxide, lithium phosphate, lithium sulfide, or an interlayer compound containing lithium may be appropriately used. In addition, two or more types of the above-described materials may be used in a mixed manner. In order to increase the energy density, a lithium-containing compound containing lithium, a transition metal element, and oxygen (O) is preferably used, and the above-described lithium-containing material containing at least one selected from a group consisting of cobalt (Co), nickel (Ni), manganese (Mn), and iron (Fe) as the transition metal element is more preferably used. As examples of such a lithium-containing compound, there are a lithium composite oxide having a structure of a layered rock salt type represented in Formula (1), Formula (2), or Formula (3), a lithium composite oxide having a structure of a spinel type represented in Formula (4), and a lithium composite phosphate having a structure of an olivine type represented in Formula (5). In particular, there are $LiNi_{0.50}CO_{0.20}Mn_{0.30}O_2$, $Li_aCoO_2$ ($a \approx Li_bNiO_2$ ($b \approx 1$), 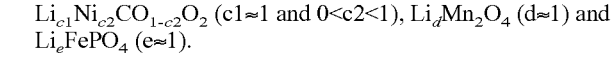 ($c1 \approx 1$ and $0 < c2 < 1$), $Li_dMn_2O_4$ ($d \approx 1$) and 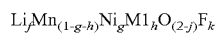 ($e \approx 1$).

$$Li_fMn_{(1-g-h)}Ni_gM1_hO_{(2-j)}F_k \qquad (1)$$

(In the formula, M1 represents at least one selected from the group of cobalt (Co), magnesium (Mg), aluminum (Al), boron (B), titanium (Ti), vanadium (V), chrome (Cr), iron (Fe), copper (Cu), zinc (Zn), zirconium (Zr), molybdenum (Mo), tin (Sn), calcium (Ca), strontium (Sr), and tungsten (W), f, g, h, j, and k are values in the respective ranges of $0.8 \leq f \leq 1.2$, $0 < g < 0.5$, $0 \leq h \leq 0.5$, $g+h<1$, $-0.1 \leq j \leq 0.2$, and $01 \leq k \leq 0.1$, and the composition of lithium changes depending on a charged or discharged state, and the value of f represents a value in a completed discharged state.).

$$Li_mNi_{(1-n)}M2_nO_{(2-p)}F_q \quad (2)$$

(In the formula, M2 represents at least one selected from the group of cobalt (Co), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), m, n, p, and q are values in the respective ranges of $0.8 \le m \le 1.2$, $0.005 \le n \le 0.5$, $0.1 \le p \le 0.2$, and $0 \le q \le 0.1$, and the composition of lithium changes depending on a charged or discharged state, and the value of m represents a value in a completed discharged state.).

$$Li_rCo_{(1-s)}M3_sO_{(2-t)}F_u \quad (3)$$

(In the formula, M3 represents at least one selected from the group of nickel (Ni), manganese (Mn), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), r, s, t, and u are values in the respective ranges of $0.8 \le r \le 1.2$, $0 \le s < 0.5$, $0.1 \le t \le 0.2$, and $0 \le u \le 0.1$, and the composition of lithium changes depending on a charged or discharged state, and the value of r represents a value in a completed discharged state.).

$$Li_vMn_{2-w}M4wOxFy \quad (4)$$

(In the formula, M4 represents at least one selected from the group of cobalt (Co), nickel (Ni), magnesium (Mg), aluminum (Al), boron (B), titanium (Ti), vanadium (V), chrome (Cr), iron (Fe), copper (Cu), zinc (Zn), molybdenum (Mo), tin (Sn), calcium (Ca), strontium (Sr), and tungsten (W), v, w, x, and y are values in the respective ranges of $0.9 \le v \le 1.1$, $0 \le w \le 0.6$, $3.7 \le x \le 4.1$, and $0 \le y \le 0.1$, and the composition of lithium changes depending on a charged or discharged state, and the value of v represents a value in a completed discharged state.).

$$Li_zM_5PO_4 \quad (5)$$

(In the formula, M5 represents at least one selected from the group of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), z is a value in the range of $0.9 \le z \le 1.1$, and the composition of lithium changes depending on a charged or discharged state, and the value of z represents a value in a completed discharged state.).

As a material composing the positive electrode that is capable of intercalating and releasing lithium, other than the above-described materials, there are inorganic compounds such $MnO_2$, $V_2O_5$, $V_6O_{13}$, NiS, and MoS that do not contain lithium.

[Negative Electrode]

The negative electrode 22 has, for example, a structure in which negative electrode active material layers 22B are disposed on both sides of a negative electrode collector 22A. Although not shown in the figure, the negative electrode active material layer 22B may be disposed on only one side of the negative electrode collector 22A. The negative electrode collector 22A is formed of a metal foil such as a copper foil. The negative electrode active material layers 22B are disposed on the negative electrode collector 22A except for both ends of the negative electrode collector 22A. The negative electrode lead 26 is connected to the negative electrode collector 22A of the negative electrode 22 in a portion where the negative electrode active material layer 22B is not disposed and the negative electrode collector 22A is exposed.

The negative electrode active material layer 22B is composed so as to contain, for example, one or two or more types of a material composing the negative electrode that is capable of intercalating and releasing lithium as a negative electrode active material. As necessary, the negative electrode active material layer 22B is composed so as to contain a binder, similarly to the positive electrode active material layer 21B.

In this secondary battery, the electrochemical equivalent of the material composing the negative electrode that is capable of intercalating and releasing lithium is larger than that of the positive electrode 21. Accordingly, in the middle of a charging process, lithium metal is not deposited in the negative electrode 22.

For example, this secondary battery is designed such that an open circuit voltage (that is, a battery voltage) at the time when the secondary battery is fully charged is in the range of 4.2 V to 4.6 V, and is preferably in the range of 4.25 V to 4.5 V. In a case where the open circuit voltage is designed to be in the range of 4.25 V to 4.5 V, expansion of the electrode is larger than that of a battery having an open circuit voltage of 4.20 V. Accordingly, a noticeable effect of employing a separator according to an is acquired. In addition, in a case where the open circuit voltage is designed to be in the range of 4.25 V to 4.5 V, the amount of discharge of lithium per unit mass increases for the same positive electrode active material. Accordingly, the amounts of the positive electrode active material and the negative electrode active material are adjusted in accordance with the amount of discharge of lithium. Therefore, a high energy density can be acquired.

As a material composing the negative electrode that is capable of intercalating and releasing lithium, for example, there is a carbon material such as non-graphitizable carbon, graphitizable carbon, graphite, pyrolytic carbons, cokes, glassy carbons, an organic polymer compound sintered body, a carbon fiber, or an activated charcoal. Among these, as the cokes, there are pitch coke, needle coke, petroleum coke, and the like. Here, the organic polymer compound sintered body refers to a material that is acquired by calcining a polymer material such as a phenolic resin or a furan resin at an appropriate temperature so as to be carbonized. Some of the organic polymer compound sintered bodies are classified as non-graphitizable carbon or graphitizable carbon. As the polymer material, there is polyacetylene or polypyrrole, or the like. According to these carbon materials, there is very little change in the crystal structure, which occurs at the time of charging or discharging, a large amount of electricity charged and discharged can be acquired, and good cycle characteristics can be acquired. Thus, the carbon materials are preferably used. Especially, since graphite has a high electrochemical equivalent and provides a high energy density, graphite is preferably used. In addition, since the non-graphitizable carbon provides superior characteristics, the non-graphitizable carbon can be preferably used. Furthermore, since a material that has low charging/discharging electric potentials, in particular, charging/discharging electric potentials that are close to those of lithium metal can easily implement a high energy density of a battery, such a material is preferably used.

As a material composing the negative electrode that is capable of intercalating and releasing lithium, there is a material that can intercalate and release lithium and contains at least one of a metal element and a metalloid element as its constituent element. By using such a material, a high energy density can be acquired. In particular, when the material is used together with a carbon material, superior cycle characteristics can be acquired together with acquiring a high energy density, which is more preferable. The material composing the negative electrode may be a simple substance, an alloy, or a compound of a metal element or a metalloid element, and may be a material that has a facet of one or two or more of the above-described elements in at least a part thereof. In the description here, an alloy includes a material containing one or more metal elements and one or more metalloid elements in addition to a material formed from two or more metal elements. Furthermore, the alloy may contain a non-metallic element. The structure thereof may be a solid solution, eutectic (eutectic mixture), an intermetallic compound, or a structure in which two or more of such structures coexist.

As a metal element or a metalloid element composing such a negative electrode material, for example, there is magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt). Such element may be crystalline or amorphous.

The material composing the negative electrode preferably contains a metal element or a metalloid element of group 4B in the short-period periodical table, and more preferably contains at least one of silicon (Si) and tin (Sn) as its constituent element. The reason is that silicon (Si) and tin (Sn) have superior capability of intercalating and releasing lithium (Li) and can implement a high energy density.

In an alloy of tin (Sn), for example, at least one selected from the group of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chrome (Cr) may be contained as a secondary constituent element other than tin (Sn). In an alloy of silicon (Si), for example, at least one selected from the group of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chrome (Cr) may be contained as a secondary constituent element other than silicon (Si).

In the compound of tin (Sn) or the compound of silicon (Si), for example, oxygen (O) or carbon (C) may be contained. In addition to tin (Sn) or silicon (Si), the above-described secondary constituent element may be contained.

As examples of the material composing the negative electrode that is capable of intercalating and releasing lithium, there are other metal compounds and polymer materials. As examples of the other metal compounds, oxides such as $MnO_2$, $V_2O_5$, and $V_6O_{13}$, sulfides such as NiS and MoS, and lithium nitride such as $LiN_3$. In addition, as examples of the polymer material, there are polyacetylene, polyaniline, polypyrrole, and the like.

Separator

FIG. 3 is a cross-sectional view representing a configuration example of the separator 23. The separator 23 allows lithium ions to pass through it while preventing formation of a short circuit for a current, which is caused by a contact between both the electrodes, by isolating the positive electrode 21 and the negative electrode 22 from each other. The separator 23 includes a first layer 23A that has first and second principal faces and a second layer 23B that is formed on at least one of both the principal faces of the first layer 23A. From the viewpoint of improving safety, it is preferable that the second layers 23B are formed on both the principal faces of the first layer 23A. In a case where the second layer is formed on at least one face of the first layer, it is preferable that the second layer is formed on a face that faces an electrode having a higher degree of expansion. Furthermore, in a case where the separator is applied to a cylinder-type battery, the electrode expands to the outermost peripheral side of the wound electrode body. Accordingly, it is preferable that the second layer is disposed on the wound inner side face of the separator. FIG. 3 represents an example in which the second layers 23B are formed on both principal faces of the first layer.

In the separator 23 according to an, a porous resin layer configuring the separator 23 has a co-continuous phase structure so as to have superior impregnability for an electrolytic solution. In addition, the separator is porous so as to have superior ion permeability. Furthermore, from the viewpoint of ion permeability, pores are maintained even for 50 $kgf/cm^2$ or higher. From this viewpoint, the second layer that contains an inorganic material that becomes a pressure buffer is formed.

Under heavy load, the pores are thought to be crushed thus decreasing the ion permeability of the separator 23. The characteristics of a battery are largely influenced by ion permeability. Thus, as an evaluation index of a separator for a change in the pressure of the inside of the battery, the compression resistance of the separator is important. In addition, a case where the pores of the first layer are clogged by inorganic materials which decrease ion permeability may be considered. Thus, according to an, in order to check ion permeability, air permeability is measured so as to clarify the state of the pores, and a superior separator structure having superior battery characteristics is found. Hereinafter, the first layer and the second layer will be described in detail.

First Layer

The first layer 23A is a microporous membrane that, for example, has a polymer resin as its major ingredient. It is preferable that a polyolefin-based resin is used as the polymer resin. The reason for this is that the microporous membrane having polyolefin as its major ingredient has a superior effect of preventing formation of a short circuit and can achieve an improvement in battery safety based on a shutdown effect. As the polyolefin-based resin, it is preferable that a simple substance of polypropylene or polyethylene or a mixture thereof is used. In addition, other than polypropylene and polyethylene, a resin having chemical stability can be used by being copolymerized or mixed with polyethylene or polypropylene.

The average membrane thickness of the first layer 23A is preferably in the range of 10.0 μm to less than 30.0 μm. In a case where the average membrane thickness exceeds 30.0 μm, the ion permeability is degraded, whereby the battery characteristics deteriorate. In addition, in such a case, the volume fraction of the separator 23 that is occupied inside the battery becomes too high, and the volume fraction of the active material is decreased, whereby the capacity of the battery decreases. Furthermore, in the case of the wound-type battery, it may be difficult to house the wound electrode body 20 inside the battery can 11. On the other hand, in a case where the average membrane thickness is less than 10.0 μm the mechanical strength becomes too low, whereby inconvenience in battery winding or a decrease in battery safety occurs.

It is preferable that the average diameter of the pores opening onto the surface of the first layer 23A is in the range of 0.03 μm to 2.00 μm. In a case where the surface pore diameter of the pores is less than 0.03 μm the ion permeability is degraded, whereby the battery characteristics deteriorate. On the other hand, in a case where the surface pore diameter of the pores is equal to or greater than 2.00 µm the mechanical strength becomes too low, whereby inconvenience in battery winding or a decrease in battery safety occurs. In addition, inorganic particles included in the second layer can easily enter into the pores, whereby there is a concern that clogging may easily occur.

Second Layer

The second layer 23B of the separator 23 is a multifunctional porous layer including inorganic particles having an electrically insulating property and a polymer resin.

In this embodiment, the second layer 23B is formed on the entire surface of each of the principal faces of the first layer 23A. Accordingly, the positive electrode 21 and the negative electrode 22 of the wound electrode body 20 are interleaved between the second layers 23B of the separators 23. The second layer 23B formed on one principal face of the first layer 23A faces the exposed portion of the positive electrode collector 21A and the positive electrode lead 25 connected to the exposed portion of the positive electrode collector 21A as well as the positive electrode active material layer 21B of the positive electrode 21. The second layer 23B formed on the other principal face of the first layer 23A faces the exposed portion of the negative electrode collector 22A and the negative electrode lead 26 connected to the exposed portion of the positive electrode collector 22A as well as the negative electrode active material layer 22B of the negative electrode 22. Accordingly, none of the positive electrode collector 21A, the negative electrode collector 22A, the positive electrode lead 25 and the negative electrode lead 26 faces the battery can 11 directly, but the second layer 23B of the separator 23 is interleaved therebetween.

The polymer resin has a three-dimensional network structure (a mesh-shaped structure) formed by continuous mutual connection. It is preferable that the second layer 23B is, for example, in the state of being fibrillated. In addition, it is preferable that inorganic particles are carried inside the network structure.

By including the inorganic particles in the second layer 23B, the inorganic particles serve as a buffer for pressure, whereby crushing of the pores of the first layer can be suppressed. In addition, since the polymer resin has the three-dimensional network structure formed by continuous mutual connection, the pore spaces can be maintained in the second layer 23B by the second layer 23B. Accordingly, deterioration of the battery characteristics (cycle characteristics) can be suppressed without degrading ion permeability, and flexibility can be provided, whereby safety can be improved. In a case where the polymer resin is fibrillated, when the average diameter of fibrils is equal to or less than 1 µm, particles that are sufficient for acquiring the insulating property can be reliably carried even when the composition ratio of an ingredient composing the fibril is low, whereby safety can be improved.

The polymer resin is not particularly limited as long as it can form a three-dimensional network structure acquired by mutual continuous connection. It is preferable that the average molecular weight of the polymer resin is in the range of 500,000 to 2,000,000. By configuring the average molecular weight to be equal to or larger than 500,000, the above-described network structure can be acquired. When the average molecular weight is equal to or less than 500,000, particle maintaining force is low, and peel-off of a layer containing the particles and the like occurs. As the polymer resin, for example, a simple substance of polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylate, styrene-butadiene rubber, nitrile butadiene rubber, polystyrene, or polycarbonate or a mixture containing two or more of the above-described materials can be used.

As the polymer resin, from the viewpoint of electro-chemical stability, polyacrylonitrile, polyvinylidene fluoride, polyhexafluoropropylene, or polyethylene oxide is preferably used. On the other hand, from the viewpoint of thermal stability and electro-chemical stability, as the polymer resin, the fluorine resin is preferably used. Furthermore, from the viewpoint of an improvement in flexibility of the second layer 23B, as the polymer resin, polyvinylidene fluoride is preferably used. When the flexibility of the second layer 23B is improved, in a case where there are impurities between the electrode and the separator 23, a shape following property for the impurities of the second layer 23B is improved, whereby safety is improved.

As the polymer resin, a heat resistant resin may be used. By using the heat resistant resin, both the insulating property and heat resistance can be acquired. As the heat resistant resin, from the viewpoint of dimensional stability under a high-temperature ambience, a resin that has high glass-transition temperature is preferable. In addition, as the polymer resin, from the viewpoint of decreasing a dimensional change or contraction due to fluidity, a resin that has melting entropy and does not have a melting point is preferably used. As such a resin, for example, there is a polyamide having an aromatic backbone, a resin that has an aromatic backbone and has imide bonding or a copolymer thereof.

The inorganic particles, for example, are inorganic particles having an electrically insulating property. The inorganic particles may have an electrically insulating property and are not particularly limited. However, inorganic particles having an inorganic oxide such as alumina, silica, zirconia, or titania as its major ingredient are preferably used.

Regarding the average particle diameter of the inorganic particles contained in the second layer 23B, the average particle diameter D20, which is a 20% cumulative diameter on the basis of the particle diameters, is greater than the average diameter of the pores that open to the surface of the first layer. There is a concern that the inorganic particles contained in the second layer may break into the inside of the pores from the openings formed on the surface of the first layer when the second layer is formed. However, by configuring the average particle diameter D20 to be greater than the average particle diameter of the pores opening onto the surface of the first layer, the quantity of inorganic particles breaking into the inside of the pores can be markedly decreased.

In addition, regarding the average particle diameter of the inorganic particles contained in the second layer 23B, the average particle diameter D90, which is a 90% cumulative particle diameter, is preferably equal to or less than ⅓ of the membrane thickness of the first layer. When particles having a large particle diameter are included as the inorganic particles, there is a concern that damage or fracture occurs in the first layer due to the inorganic particles. In addition, when inorganic particles having a large particle diameter are included, there is a concern that the second layer may not be formed near the large particles. The reason for this is that a process of coating the second layer with, for example, a coating material containing inorganic particles and a polymer resin is performed, and the coating material does not spread into the side area of each large particle in the coating direction. Accordingly, by not including organic particles having as large a diameter as possible, the second layer can be formed in a stable manner.

It is preferable that the area density per the unit area of the second layer 23B is equal to or greater than 0.2 mg/cm$^2$ and equal to or lower than 1.8 mg/cm$^2$. In a case where the area density per the unit area is less than 0.2 mg/cm$^2$, short-time resistance is decreased so as to increase the amount of heat generation at the time of formation of a short circuit, whereby the safety thereof is degraded. In addition, uneven coating or a coating break of the coating material occurs in the second layer, and there is a concern that it is difficult to form a separator according to an. On the other hand, in a case where the area density per the unit area exceeds 1.8 mg/cm$^2$, safety can be secured. However, the thickness of the separator 23 is increased so as to excessively increase the occupied volume fraction of the separator 23 inside the battery and decrease the volume fraction of the active material, whereby the capacity of the battery is decreased, which is not preferable. Furthermore, in the case of a cylinder-type battery, the component diameter of the wound electrode body 20 is increased, and there is a concern that it is difficult to insert the wound electrode body 20 into the battery can 11.

It is preferable that the mixed amount (the volume fraction) of the inorganic particles in the second layer 23B is equal to or greater than 60 vol % and equal to or less than 95 vol %. In a case where the mixed amount of the inorganic particles is less than 60 vol %, the pressure resistance of the separator is decreased, and the mixed amount of the resin is large, whereby the pores formed on the surface of the first layer may easily be crushed by the resin. In addition, in a case where the mixed amount of the inorganic particles is 0 vol %, the cycle characteristics are also degraded. On the other hand, in a case where the mixed amount of the inorganic particles exceeds 95 vol %, the particle maintaining force of the resin is decreased. Accordingly, peeling-off, that is, powdering of the inorganic particles occurs.

In such a separator 23, it is preferable that the amount of change (that is, a difference between the air permeability before formation of the second layer and the air permeability after the formation of the second layer) in the air permeability after formation of the second layer 23B is equal to or less than 60 sec/100 ml. The air permeability of the separator 23 in which the second layer 23B is formed on the surface of the first layer 23A is higher than the air permeability thereof in which only the first layer 23A is disposed. However, it is preferable that the amount of change in the air permeability after formation of the second layer 23B is small. As the number of the inorganic particles breaking into the pores of the surface of the first layer increases, the difference between the air permeability of the first layer only and the air permeability after formation of the second layer increases. In other words, in order to suppress clogging of the separator 23 with the inorganic particles so as to maintain high ion permeability, it is preferable that a difference between the air permeability of the first layer only and the air permeability after formation of the second layer is small.

Here, the air permeability can be measured, for example, by using a Gurley-type densometer.

In addition, it is preferable that the air permeability (the air permeability after the pressure load of the second layer) at a time point when the separator after formation of the second layer is placed at an environment of 60° C. and then pressure of 50 kgf/cm$^2$ is applied to the separator after the formation of the second layer for over two minutes is equal to or lower than 35%. It is preferable that the rising rate of the air permeability at a time when pressure is applied to the separator after the formation of the second layer 23B is low. In a case where the pressure is applied, as the pores of the separator 23 are crushed, the rising rate of the air permeability at the time of the pressure load decreases by as much. In other words, in order to maintain high pressure resistance of the separator 23, it is preferable that the rising rate of the air permeability in the air permeability before the application of the pressure load and the air permeability after application of the pressure load is low.

Electrolytic Solution

An electrolytic solution that is a liquid-phase electrolyte is impregnated in the separator 23. The electrolytic solution contains a solvent and an electrolyte salt that is dissolved in the solvent.

As the solvent, cyclic ester carbonate such as ethylene carbonate or propylene carbonate can be used. It is preferable that one of ethylene carbonate and propylene carbonate, and more particularly, a mixture of both ethylene carbonate and propylene carbonate is used. The reason for this is that the cycle characteristics can be improved.

As the solvent, it is preferable to mix chained ester carbonate such as diethyl carbonate, dimethyl carbonate, ethyl methyl carbonate, or methyl propyl carbonate into the above-described cyclic ester carbonate. The reason for this is that a high ionic conduction property can be acquired.

It is preferable that the solvent further contains 2,4-difluoro anisole or vinylene carbonate. The reason for this is that 2,4-difluoro anisole can improve the amount of electricity discharged, and vinylene carbonate can improve the cycle characteristics. Accordingly, by using a solvent acquired by mixing the above-described materials, the amount of electricity discharged and the cycle characteristics can be improved, which is preferable.

As examples of solvents other than the above-described materials, there are butylene carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, acetonitrile, glutaronitrile, adiponitrile, methoxyacetonitrile, 3-methoxypropionitrile, N,N-dimethyl formamide, N-methylpirroridinon, N-methyl oxazoridinon, N,N-dimethylimidazolidinone, nitromethane, nitroethane, sulpholane, dimethyl sulfoxide, trimethyl phosphate, and the like.

In addition, a compound acquired by substituting at least a part of hydrogen of the above-described nonaqueous solvent with fluorine may improve the reversibility of an electrode reaction depending on the types of combined electrodes, which may be preferable.

As an example of the electrolytic salt, there is lithium salt. Thus, one type of the lithium salt may be used alone, or two or more types of the lithium salt may be used by being mixed together. As examples of the lithium salt, there are $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, difluoro[oxalato O, O'] lithium borate, lithium-bis (oxalate)borate, LiBr, or the like. Among these materials, $LiPF_6$ is preferable in that a high ionic conduction property can be acquired and the cycle characteristics can be improved.

Method of Manufacturing Battery

Next, an example of a method of manufacturing a non-aqueous electrolyte secondary battery according to the first will be described.

First, for example, a positive electrode mixture is prepared by mixing a positive electrode material, a conductive material, and a binder, and the positive electrode mixture is dispersed into a solvent medium such as N-methyl-2-pyrrolidone, whereby a positive electrode mixture slurry having a past form is prepared. Next, a positive electrode active material layer 21B is formed so as to form a positive electrode 21 by coating the positive electrode collector 21A with the positive electrode mixture slurry, drying the solvent medium, and performing compression molding for the coated positive electrode collector 21A by using a roll-pressing machine or the like.

In addition, for example, a negative electrode mixture is prepared by mixing a negative electrode active material and a binder, and the negative electrode mixture is dispersed into a solvent medium such as N-methyl-2-pyrrolidone, whereby a negative electrode mixture slurry in a paste form is prepared. Next, a negative electrode active material layer 22B is formed so as to prepare a negative electrode 22 by coating the negative electrode collector 22A with the negative electrode mixture slurry, drying the solvent medium, and performing compression molding for the coated negative electrode collector 22A by using a roll-pressing machine or the like.

Next, a positive electrode lead 25 is installed to the positive electrode collector 21A by performing a welding process or the like, and a negative electrode lead 26 is installed to the negative electrode collector 22A by performing a welding process or the like. Next, the positive electrode 21 and the negative electrode 22 are wound with separators 23 interleaved therebetween. Next, the front end portion of the positive electrode lead 25 is welded to a safety valve mechanism 15, and the front end portion of the negative electrode lead 26 is welded to a battery can 11. Then, the positive electrode 21 and the negative electrode 22 that have been wound are housed inside the battery can 11 with one pair of insulating plates 12 and 13 being interposed therebetween. Next, after the positive electrode 21 and the negative electrode 22 are housed inside the battery can 11, an electrolytic solution is injected into the inside of the battery can 11 so as to impregnate the separator 23. Next, the battery cover 14, the safety valve mechanism 15, and a PTC device 16 are fixed in a caulking manner to the end portion of the opening of the battery can 11 through a sealing gasket 17. Accordingly, the secondary battery shown in FIG. 1 can be acquired.

In the secondary battery according to the first embodiment, the open-circuit voltage in the fully-charged state is, for example, in the range of 4.2 V to 4.6 V, and is preferably in the range of 4.25 V to 4.5 V. The reason for this is that, in a case where the open-circuit voltage is equal to or higher than 4.25 V, the use rate of the positive electrode active material can be increased, and more energy can be drawn out. In addition, in a case where the open-circuit voltage is equal to or lower than 4.5 V, oxidation of the separator 23, a chemical change of the electrolytic solution, or the like can be suppressed.

In the secondary battery according to the first embodiment, when a charging process is performed, lithium ions are released from the positive electrode active material layer 21B and are intercalated into the material composing the negative electrode that is capable of intercalating and releasing lithium contained in the negative electrode active material layer 22B through the electrolytic solution. Next, when a discharging process is performed, the lithium ions intercalated into the material composing the negative electrode that is capable of intercalating and releasing lithium contained in the negative electrode active material layer 22B are released and are intercalated into the positive electrode active material layer 21B through the electrolytic solution.

According to the separator of the first embodiment, even when the electrode is expanded in accordance with charging/discharging of the battery, high pressure-resistance is implemented, whereby a high ion permeability can be maintained without crushing the pores of the separator. In contrast, according to a single-layered polyolefin separator in related art, pores thereof are crushed in accordance with the expansion of the electrode, whereby the battery characteristics are degraded.

In addition, in the first embodiment, since the separator 23 resides on the outer periphery of the wound electrode body 20 and the second layer 23B of the separator 23 is disposed thereon, the inorganic particles intervene between the outer end of the negative electrode 22 and the battery can 11. Therefore, a short circuit between the wound electrode body 20 and the battery can 11 is effectively prevented and a high degree of safety can be achieved.

The wound electrode body 20 pushes the battery can 11 due to the expansion of the wound electrode body 20 accompanying charging of the battery. Further, when the lead (the negative electrode lead 26 in this embodiment) is disposed on the outer end of the positive electrode 21 or the negative electrode 22 (the negative electrode 22 in this embodiment), stress is liable to be concentrated on the edge of the lead. Therefore, there is a possibility that the outer end of the separator 23 is damaged. However, in this embodiment, since the inorganic particles in the second layer 23B of the separator 23 face this portion, a risk of tearing of the separator 23 is reduced and a degree of safety is increased accordingly.

2. Second Embodiment

Configuration of Battery

Figure 4:
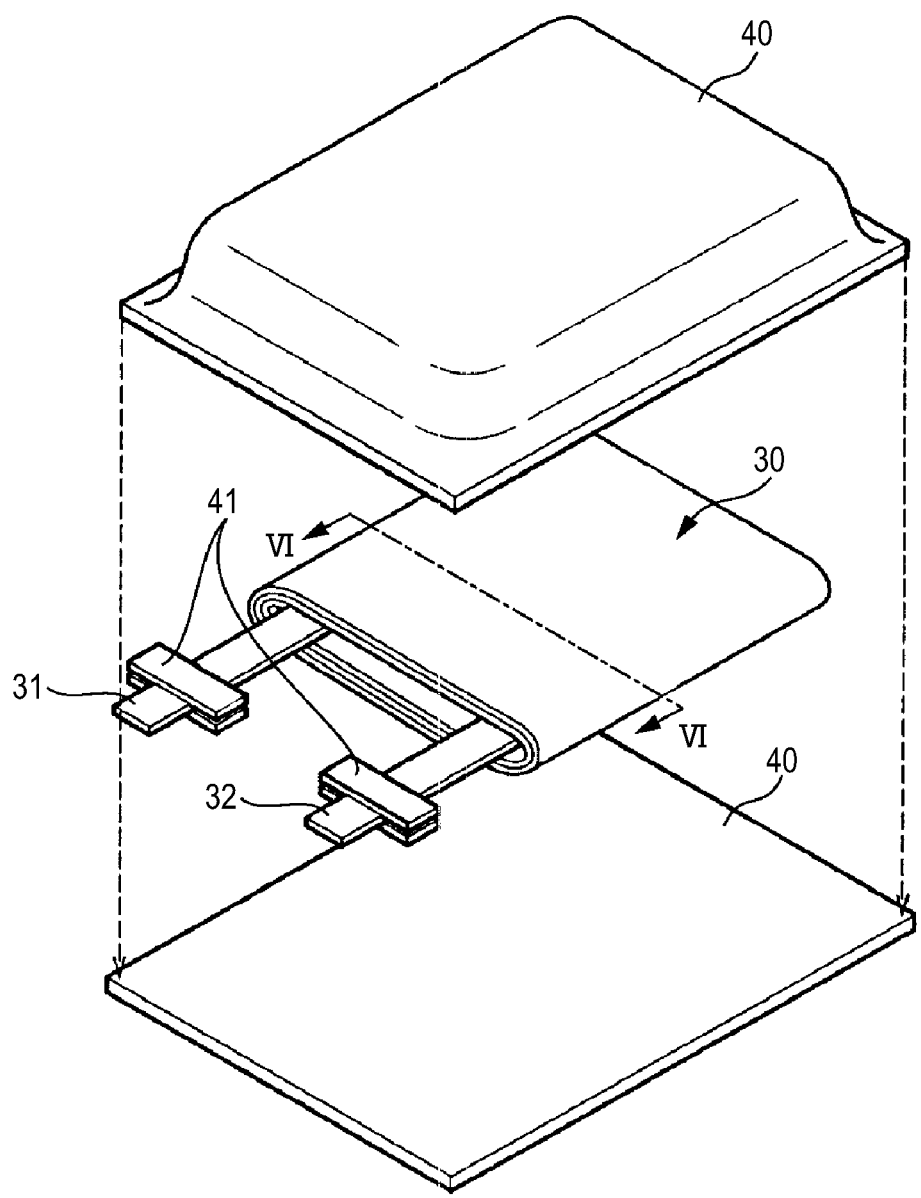
FIG. 4 is an exploded perspective view representing a configuration example of a nonaqueous electrolyte secondary battery according to a second.

FIG. 4 is an exploded perspective view representing a configuration example of a nonaqueous electrolyte secondary battery according to a second. In the secondary battery, a wound electrode body 30, to which a positive electrode lead 31 and a negative electrode lead 32 are installed, is housed inside a film-shaped exterior member 40. Accordingly, miniaturization, light weight, and thinness of the exterior member 40 can be implemented.

The positive electrode lead 31 and the negative electrode lead 32 are disposed from the inside of the exterior member 40 toward the outside thereof, for example, so as to be derived in the same direction. The positive electrode lead 31 and the negative electrode lead 32 are composed of metal materials such as aluminum, copper, nickel, and stainless steel and are respectively formed in a thin plate shape or a mesh shape.

The exterior member 40, for example, is configured by an aluminum-laminated film in a rectangular shape in which a nylon film, an aluminum foil, and a polyethylene film are bonded together in the mentioned order. In the exterior member 40, for example, the polyethylene film side and the wound electrode body 30 are arranged so as to face each other, and the outer frame portions thereof are brought into close contact with each other by welding or by using an adhesive agent. Between the exterior member 40 and the positive electrode lead 31 and the negative electrode lead 32, an adhesive film 41 that is used for preventing penetration of the outer air is inserted. The adhesive film 41 is composed of a material that has adhesiveness to the positive electrode lead 31 and the negative electrode lead 32, for example, a polyolefin resin formed from polyethylene, polypropylene, modified polyethylene, modified polypropylene, or the like.

Instead of the above-described aluminum-laminated film, the exterior member 40 may be configured by a laminated film having a different structure, a polymer film formed from polypropylene or the like, or a metal film.

Figure 5:
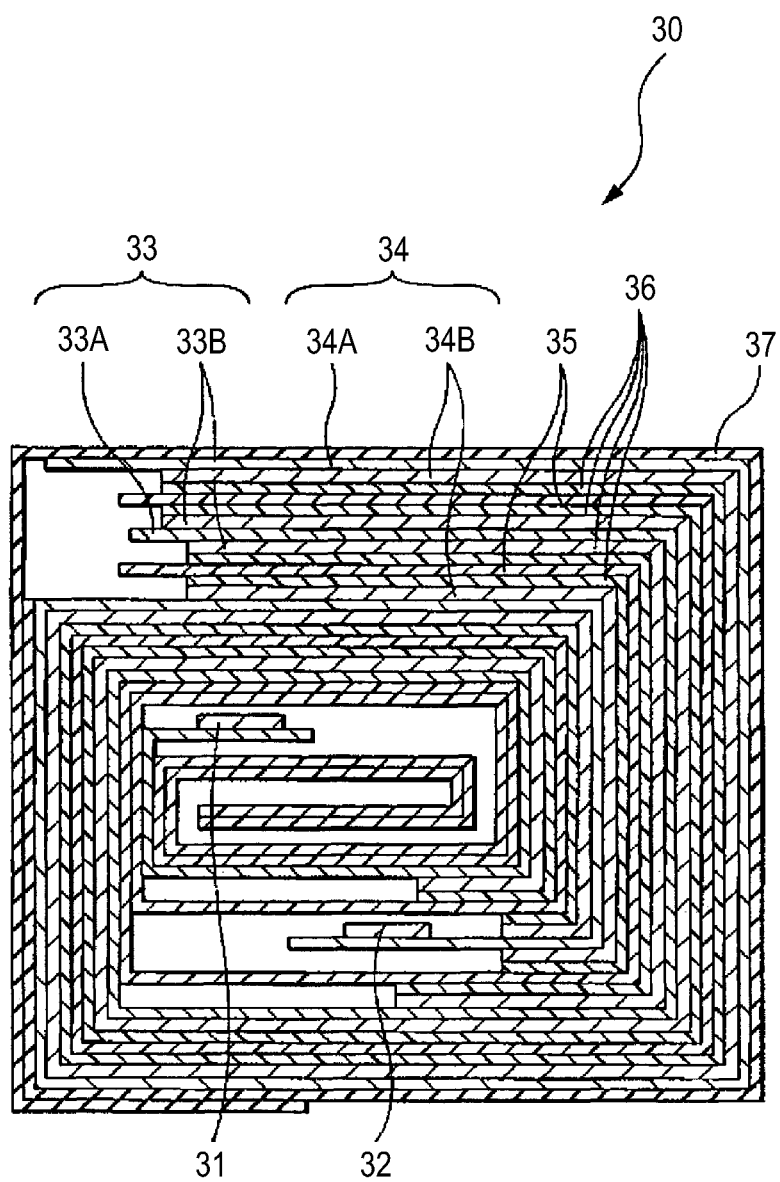
FIG. 5 is a cross-sectional view of a wound electrode body, which is shown in FIG. 4, taken along line VI-VI.

FIG. 5 is a cross-sectional view of the wound electrode body 30, which is shown in FIG. 4, taken along line VI-VI. The wound electrode body 30 is acquired by stacking a positive electrode 33 and a negative electrode 34 with separators 35 and electrolyte layers 36 interleaved therebetween so as to be wound, and the outermost circumferential portion thereof is protected by a protection tape 37.

The positive electrode 33 has a structure in which a positive electrode active material layer 33B is disposed on one side or both sides of a positive electrode collector 33A. The negative electrode 34 has a structure in which a negative electrode active material layer 34B is disposed on one side or both sides of a negative electrode collector 34A, and the negative electrode active material layer 34B and the positive electrode active material layer 33B are arranged so as to face each other. The configurations of the positive electrode collector 33A, the positive electrode active material layer 33B, the negative electrode collector 34A, the negative electrode active material layer 34B, and the separator 35 are the same as those of the positive electrode collector 21A, the positive electrode active material layer 21B, the negative electrode collector 22A, the negative electrode active material layer 22B, and the separator 23 of the first embodiment.

The electrolyte layer 36 contains an electrolytic solution and a polymer compound that becomes a maintaining body that maintains the electrolytic solution and is formed as gel. The gel-shaped electrolyte layer 36 can acquire high ion conductivity and prevent leakage of the battery, which is preferable. The composition of the electrolytic solution (that is, a solvent, electrolyte salt, and the like) is the same as that of the secondary battery according to the first embodiment. As examples of the polymer compound, there are polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylate, styrene-butadiene rubber, nitrile butadiene rubber, polystyrene, and polycarbonate. Especially, from the viewpoint of electro-chemical stability, polyacrylonitrile, polyvinylidene fluoride, polyhexafluoropropylene, or polyethylene oxide is preferably used.

Method of Manufacturing Battery

Next, an example of a method of manufacturing a nonaqueous electrolyte secondary battery according to the second will be described.

First, the electrolyte layer 36 is formed by coating the positive electrode 33 and the negative electrode 34 with a precursor solution that contains the solvent, the electrolyte salt, the polymer compound, and a mixed solvent medium and volatilizing the mixed solvent medium. Thereafter, a positive electrode lead 31 is installed to the end portion of the positive electrode collector 33A by performing a welding process or the like, and a negative electrode lead 32 is installed to the end portion of the negative electrode collector 34A by performing a welding process or the like. Next, the wound electrode body 30 is formed by stacking the positive electrode 33 and the negative electrode 34, in which the electrolyte layer 36 is formed, with the separators 35 interleaved therebetween, then winding the stacked body in the direction of the length thereof, and bonding the protection tape 37 to the outermost circumferential portion thereof. Finally, for example, with the wound electrode body 30 being pinched between the exterior members 40, the outer frame portions of the exterior members 40 are brought into close contact with each other and are sealed by performing a thermal welding process or the like. At that time, between the positive and negative electrode leads 31 and 32 and the exterior members 40, an adhesive film 41 is inserted. Accordingly, the secondary battery shown in FIGS. 4 and 5 can be acquired.

In addition, the secondary battery may be prepared as follows. First, a positive electrode 33 and a negative electrode 34 are prepared as described above, and a positive electrode lead 31 and a negative electrode lead 32 are installed to the positive electrode 33 and the negative electrode 34. Next, a wound body, which is a precursor of a wound electrode body 30, is formed by stacking the positive electrode 33 and the negative electrode 34 with separators 35 interleaved therebetween, then winding the stacked body, and bonding a protection tape 37 to the outermost circumferential portion thereof. Next, the wound body is pinched between the exterior members 40, and the outer circumferential portion except for one side is thermally welded so as to form a pouch shape, and the wound body is housed inside the exterior members 40. Next, an electrolyte composition material that contains a solvent, an electrolyte salt, a monomer that is a raw material of the polymer compound, a polymerization initiator, and other materials such as a polymerization inhibitor are prepared as necessary, and the electrolyte composition material is injected into the inside of the exterior members 40.

After the electrolyte composition material is injected, the opening portion of the exterior portions 40 is thermally welded under a vacuum atmosphere so as to be sealed. Next, the monomer is polymerized by applying heat thereto so as to form as a polymer compound, whereby an electrolyte layer 36 as gel is formed. The secondary battery shown in FIG. 4 can be acquired by performing the above-described process.

The operations and advantages of the nonaqueous electrolyte secondary battery according to the second embodiment are the same as those of the nonaqueous electrolyte secondary battery according to the first embodiment.

EXAMPLES

Example 1

In Example 1, regarding a separator in which a second layer is disposed on the surface of a first layer serving as a base member, batteries were manufactured by employing separators that were prepared by changing the average pore diameter of the pores formed on the surface of the first layer and the average particle diameter D20 of the inorganic particles mixed into the second layer, and the separators and the battery characteristics were evaluated.

Example 1-1

Preparation of Separator
Preparation of Coating Material

First, a polyvinylidene fluoride (PVdF) resin having an average molecular weight of about 1,000,000 was dissolved into N-methyl-2-pyrrolidone (NMP) so as to be 2 wt %. Next, in the obtained PVdF/NMP solution, alumina particles having an average particle diameter D20 of 0.21 μm and an average particle diameter D90 of 3.18 μm as the inorganic particles were input at the volume ratio PVdF:alumina particles=5:95 (volume fraction 95.0 vol %). Then, after the solution was agitated until a uniform slurry was formed, a coating process was performed by performing a mesh pass. The volume fraction was acquired by using the following equation by using the volume ratio of the inorganic particles and the volume ratio of the resin.

Volume fraction Ratio[vol %]=((Volume Ratio of Inorganic Particles)/(Volume Ratio of Inorganic Particles+Volume Ratio of Resin))×100

<Coating Process>

Next, both sides of the polyethylene microporous membrane (first layer) in which the average pore diameter of a plurality of pores exposed on the surface was 0.05 μm were coated in a table coater with the above-described coating material in a thickness of 16 μm. At this time, the coating material is adjusted such that the area density is 0.60 mg/cm². Next, second layers containing the alumina particles were formed on both sides of the polyethylene microporous membrane as the first layer by performing phase separation through a water bath and then performing a drying process. As a result, a separator was acquired.

Example 1-2

A separator was prepared in the same manner as in Example 1-1 except for adjusting the mixed amount of the alumina particles to be 90.0 vol % at the time of preparation of the coating material.

Example 1-3

A separator was prepared in the same manner as in Example 1-1 except for adjusting the mixed amount of the alumina particles to be 82.0 vol % at the time of preparation of the coating material.

Example 1-4

A separator was prepared in the same manner as in Example 1-1 except for adjusting the mixed amount of the alumina particles to be 69.0 vol % at the time of preparation of the coating material.

Example 1-5

A separator was prepared in the same manner as in Example 1-1 except for adjusting the mixed amount of the alumina particles to be 60.0 vol % at the time of preparation of the coating material.

Example 1-6

A separator was prepared in the same manner as in Example 1-1 except for using silica particles having an average particle diameter D20 of 0.80 μm and an average particle diameter D90 of 2.00 μm as the inorganic particles that were mixed at the time of preparation of the coating material.

Example 1-7

A separator was prepared in the same manner as in Example 1-1 except for using a polyethylene microporous membrane having an average pore diameter of a plurality of pores exposed on the surface to be 0.10 μm as the first layer, using silica particles having an average particle diameter D20 of 2.10 μm and an average particle diameter D90 of 5.00 μm as the inorganic particles that were mixed at the time of preparation of the coating material, and adjusting the mixed amount of the silica particles to be 90.0 vol %.

Example 1-8

A separator was prepared in the same manner as in Example 1-1 except for using a polyethylene microporous membrane having an average pore diameter of a plurality of pores exposed on the surface to be 0.50 μm as the first layer, using silica particles having an average particle diameter D20 of 2.10 μm and an average particle diameter D90 of 5.00 μm as the inorganic particles that were mixed at the time of preparation of the coating material, and adjusting the mixed amount of the silica particles to be 90.0 vol %.

Example 1-9

A separator was prepared in the same manner as in Example 1-1 except for using a polyethylene microporous membrane having an average pore diameter of a plurality of pores exposed on the surface to be 1.50 μm as the first layer, using silica particles having an average particle diameter D20 of 2.10 μm and an average particle diameter D90 of 5.00 μm as the inorganic particles that were mixed at the time of preparation of the coating material, and adjusting the mixed amount of the silica particles to be 90.0 vol %.

Example 1-10

A separator was prepared in the same manner as in Example 1-1 except for using a polyethylene microporous membrane having an average pore diameter of a plurality of pores exposed on the surface to be 2.00 μm as the first layer, using silica particles having an average particle diameter D20 of 2.10 μm and an average particle diameter D90 of 5.00 μm as the inorganic particles that were mixed at the time of preparation of the coating material, and adjusting the mixed amount of the silica particles to be 90.0 vol %.

Comparative Example 1-1

A separator was prepared in the same manner as in Example 1-1 except for using a polyethylene microporous membrane having an average pore diameter of a plurality of pores exposed on the surface to be 0.21 μm as the first layer.

Comparative Example 1-2

A separator was prepared in the same manner as in Example 1-1 except for using a polyethylene microporous membrane having an average pore diameter of a plurality of pores exposed on the surface to be 0.21 μm as the first layer and adjusting the mixed amount of alumina particles to be 90.0 vol % at the time of preparation of the coating material.

Comparative Example 1-3

A separator was prepared in the same manner as in Example 1-1 except for using a polyethylene microporous membrane having an average pore diameter of a plurality of pores exposed on the surface to be 0.21 μm as the first layer and adjusting the mixed amount of alumina particles to be 82.0 vol % at the time of preparation of the coating material.

Comparative Example 1-4

A separator was prepared in the same manner as in Example 1-1 except for using a polyethylene microporous membrane having an average pore diameter of a plurality of pores exposed on the surface to be 0.21 µm as the first layer and adjusting the mixed amount of alumina particles to be 69.0 vol % at the time of preparation of the coating material.

Comparative Example 1-5

A separator was prepared in the same manner as in Example 1-1 except for using a polyethylene microporous membrane having an average pore diameter of a plurality of pores exposed on the surface to be 0.21 µm as the first layer and adjusting the mixed amount of alumina particles to be 60.0 vol % at the time of preparation of the coating material.

Comparative Example 1-6

A separator was prepared in the same manner as in Example 1-1 except for using a polyethylene microporous membrane having an average pore diameter of a plurality of pores exposed on the surface to be 2.20 µm as the first layer and mixing silica particles having an average particle diameter D20 of 2.10 µm and an average particle diameter D90 of 5.00 µm so as to adjust the mixed amount of silica particles to be 90.0 vol % at the time of preparation of the coating material.

Comparative Example 1-7

A separator was prepared in the same manner as in Example 1-1 except for not disposing the second layer.

Evaluation (a) Difference of Air Permeability of Separator

The air permeability of the first layer before formation of the second layer was measured. Subsequently, the air permeability of the separator after formation of the second layer was measured in the same manner as that for measurement of the first layer. Then, a difference between the air permeability of the first layer and the air permeability of the second layer was calculated by using the following equation.

Difference of Air Permeability[sec/100 ml]=Air Permeability of First Layer-Air Permeability of Second Layer Here, the air permeability was measured by using a Gurley-type densometer (manufactured by ToYo Seiki Co., Ltd.).

(b) Air Permeability Rising Rate of Separator

The separator after formation of the second layer is placed under an ambience of 60° C., and the air permeability (the air permeability after the pressure load of the second layer) at a time point when pressure of 50 kgf/cm$^2$ was applied to the separator after the formation of the second layer for two minutes. Then, the air permeability rising rate after the pressure load under the above-described condition was calculated by using the following equation.

Air Permeability Rising Rate[%]=(Air Permeability After Pressure Load of Second Layer-Air Permeability of Second Layer)/Air Permeability of Second Layer In addition, in a measurement test of an air permeability rising rate, the degree of clogging at a time point when a load of 50 kgf/cm$^2$ is applied can be measured. As the air permeability rising rate at constant pressure is increased, the degree of crushing the pores in the case of application of the pressure can be determined to increase.

(c) Capacity Maintaining Rate

Cylinder-type batteries were manufactured by employing the above-described separators, and the capacity maintaining rates at the 100th cycle were measured. The cylinder-type batteries of the examples and the comparative examples were placed in a constant temperature bath at 25° C. and were charged with a constant current of 0.2 C. Then, the cylinder-type batteries were switched to constant voltage charging at a time point when the battery voltage becomes 4.2 V. Thereafter, constant current charging with a discharge current of 0.2 C was performed until the battery voltage becomes 3.0 V, and then the amount of electricity discharged (first-time capacity) was measured.

Under the above-described charging/discharging conditions, 100 cycles of charging/discharging were repeated, and the amount of electricity discharged at the 100th cycle was measured. The capacity maintaining rate at the 100th cycle was calculated by using the following equation.

Capacity Maintaining Rate[%]=(Amount of Electricity Discharged at the 100th Cycle/First-Time Capacity)×100

In addition, the cylinder-type battery was prepared as follows.

Preparation of Cylinder-Type Battery

Preparation of Positive Electrode

Lithium cobalt oxide (LiCoO$_2$) 92 wt % as a positive electrode active material, graphite powders 5 wt % as a conductive material, and polyvinylidene fluoride (PVdF) 3 wt % as a binder were uniformed mixed together, and the mixture is dispersed into N-methyl-2-piroridinon (NMP), whereby a positive electrode mixture in a slurry state was prepared. Then, both sides of an aluminum foil that becomes a positive electrode collector were uniformly coated with the positive electrode mixture, and the coated aluminum foil was decompressed and dried at 100° C. for 24 hours, whereby a positive electrode active material layer was formed. Subsequently, the positive electrode active material layer was pressed and molded so as to be a positive electrode sheet by a roll pressing machine.

Preparation of Negative Electrode

Synthetic graphite 91 wt % and polyvinylidene fluoride (PVdF) 9 wt % were uniformed mixed together, and the mixture is dispersed into N-methyl-2-piroridinon (NMP), whereby a negative electrode mixture in a slurry state was prepared. Next, both sides of a copper foil that becomes a negative electrode collector were uniformly coated with the negative electrode mixture, and the coated copper foil was decompressed and dried at 120° C. for 24 hours, whereby a negative electrode active material layer was formed. Subsequently, the negative electrode active material layer was pressed and molded so as to be a negative electrode sheet by a roll pressing machine.

Preparation of Electrolytic Solution

An electrolytic solution that contains a mixed solvent acquired by mixing ethylene carbonate (EC), ethyl methyl carbonate (EMC), and dimethyl carbonate (DMC) at a volume ratio of 2:2:6 as an electrolytic solution and lithium hexafluorophosphate (LiPF$_6$) as a electrolyte salt was used. The density of lithium hexafluorophosphate (LiPF$_6$) in the electrolytic solution was 1 mol/dm$^3$.

Assembly of Battery

A positive electrode lead was installed to the positive electrode collector prepared as described above by performing a welding process or the like, and a negative electrode lead was installed to the negative electrode collector by performing a welding process. Next, the positive electrode and the negative electrode are wound with separators therebetween. The front end portion of the positive electrode lead is welded to a safety valve mechanism, and the front end portion of the negative electrode lead is welded to a battery can. Then, the positive electrode and the negative electrode that have been wound are housed inside the battery can with one pair of insulating plates being interposed therebetween. After the positive electrode and the negative electrode are housed inside the battery can, an electrolytic solution is injected into the inside of the battery can so as to impregnate the separator. Thereafter, by caulking the battery can with the battery cover through a gasket, a cylinder-type battery having size 18650 could be acquired. In Table 1 shown below, the evaluation results are represented.

small on the whole, the number of the inorganic particles breaking into the pores opening onto the surface of the first layer in a coating process of a coating material was increased. Accordingly, the opening diameter of the first layer decreases or the pores opening onto the surface were clogged, whereby the ion permeability was decreased.

According to a separator of an, the second layer containing inorganic particles is formed on the surface of the first layer. Accordingly, the air permeability after formation of the second layer is higher than that of the first layer. Accordingly, as the number of the inorganic particles break-

TABLE 1

| | First Layer | | | Second Layer | | | | | | |
|---|---|---|---|---|---|---|---|---|---|---|
| | Material | Thickness [μm] | Average Surface Pore Diameter [μm] | Resin Material | Inorganic Particle | Average Particle Diameter D20 [μm] | Average Particle Diameter D90 [μm] | Particle Mixed Amount [Vol %] | Air Permeability Difference [Sec/100 ml] | Air Permeability Rising Rate [%] | Capacity Maintaining Rate |
| Example 1-1 | Polyethylene | 16.0 | 0.05 | PVdF | Alumina | 0.21 | 3.18 | 95.0 | 10 | 10 | ○ |
| Example 1-2 | Polyethylene | 16.0 | 0.05 | PVdF | Alumina | 0.21 | 3.18 | 90.0 | 10 | 15 | ○ |
| Example 1-3 | Polyethylene | 16.0 | 0.05 | PVdF | Alumina | 0.21 | 3.18 | 82.0 | 10 | 18 | ○ |
| Example 1-4 | Polyethylene | 16.0 | 0.05 | PVdF | Alumina | 0.21 | 3.18 | 69.0 | 10 | 28 | ○ |
| Example 1-5 | Polyethylene | 16.0 | 0.05 | PVdF | Alumina | 0.21 | 3.18 | 60.0 | 10 | 35 | ○ |
| Example 1-6 | Polyethylene | 16.0 | 0.05 | PVdF | Silica | 0.80 | 2.00 | 95.0 | 10 | 10 | ○ |
| Example 1-7 | Polyethylene | 16.0 | 0.10 | PVdF | Silica | 2.10 | 5.00 | 90.0 | 10 | 8 | ○ |
| Example 1-8 | Polyethylene | 16.0 | 0.50 | PVdF | Silica | 2.10 | 5.00 | 90.0 | 10 | 8 | ○ |
| Example 1-9 | Polyethylene | 16.0 | 1.50 | PVdF | Silica | 2.10 | 5.00 | 90.0 | 10 | 6 | ○ |
| Example 1-10 | Polyethylene | 16.0 | 2.00 | PVdF | Silica | 2.10 | 5.00 | 90.0 | 10 | 6 | ○ |
| Comparative Example 1-1 | Polyethylene | 16.0 | 0.21 | PVdF | Alumina | 0.21 | 3.18 | 95.0 | 70 | 37 | X |
| Comparative Example 1-2 | Polyethylene | 16.0 | 0.21 | PVdF | Alumina | 0.21 | 3.18 | 90.0 | 70 | 38 | X |
| Comparative Example 1-3 | Polyethylene | 16.0 | 0.21 | PVdF | Alumina | 0.21 | 3.18 | 82.0 | 70 | 39 | X |
| Comparative Example 1-4 | Polyethylene | 16.0 | 0.21 | PVdF | Alumina | 0.21 | 3.18 | 69.0 | 70 | 41 | X |
| Comparative Example 1-5 | Polyethylene | 16.0 | 0.21 | PVdF | Alumina | 0.21 | 3.18 | 60.0 | 70 | 43 | X |
| Comparative Example 1-6 | Polyethylene | 16.0 | 2.20 | PVdF | Silica | 2.10 | 5.00 | 90.0 | 100 | 45 | X |
| Comparative Example 1-7 | Polyethylene | 16.0 | 0.05 | — | — | — | — | — | 10 | 50 | X |

In Table 1, a case where the capacity maintaining rate is equal to or greater than 80% is denoted by "o", and a case where the capacity maintaining rate is less than 80% is denoted by "x".

As is apparent from Table 1, in Examples 1-1 to 1-10 employing a separator in which a second layer containing inorganic particles having an average particle diameter D20 larger than the average pore diameter of pores of the surface of the first layer is formed, the capacity maintaining rate was equal to or greater than 80%.

In contrast, in Comparative Examples 1-1 to 1-6 employing a separator in which a second layer containing inorganic particles having an average particle diameter equivalent to the average pore diameter of the pores of the surface of the first layer is formed, the capacity maintaining rate was less than 80%.

In addition, also in Comparative Example 1-7 in which a second layer is not disposed, the capacity maintaining rate was decreased. It is thought that the reason for this is a decrease in the ion permeability that is caused by crushing of the holes of the first layer, that is, a polyethylene microporous membrane as a separator due to expansion of the electrode.

In each comparative example, since the particle diameter of the inorganic particles contained in the second layer is ing into the pores of the surface of the first layer is increased, a difference between the air permeability of the first layer only and the air permeability of the separator after formation of the second layer increases. In other words, it is known that, in order to maintain high ion permeability, the difference between the air permeability of the first layer only and the air permeability of the separator after the formation of the second layer is desired to be decreased.

As is apparent from Table 1, in each comparative example employing a separator in which the difference of the air permeability was 70 sec/100 ml, the capacity maintaining rate was decreased. Accordingly, it was found that the difference of the air permeability is desired to be equal to or less than 60 sec/100 ml. Similarly, it was found that, from the viewpoint of the air permeability rising rate, the air permeability rising rate is desired to be equal or less than 35%.

Example 2

In Example 2, batteries were prepared by employing separators that were prepared by changing the average pore diameter of the pores of the surface of the first layer, and the separators and the battery characteristics were evaluated.

Example 2-1

Preparation of Separator
Preparation of Coating Material

First, as the inorganic particles dispersed into a polyvinylidene fluoride (PVdF) resin, alumina particles having an average particle diameter D20 of 0.21 µm and an average particle diameter D90 of 3.18 µm were used, and the mixed amount of the alumina particles is adjusted to 90.0 vol % so as to be used as the coating material.

Coating Process

Next, both sides of the polyethylene microporous membrane (first layer) in which the average pore diameter of a plurality of pores exposed on the surface was 0.05 µm were coated in a table coater with the above-described coating material in a thickness of 16 µm. At this time, the coating material is adjusted such that the area density is 0.60 mg/cm2. Next, second layers containing the alumina particles were formed on both sides of the polyethylene microporous membrane as the first layer by performing phase separation through a water bath and then performing a drying process. As a result, a separator was acquired.

Example 2-2

A separator was prepared in the same manner as Example 2-1 except for using a polyethylene microporous membrane having a thickness of 9.0 µm, in which an average pore diameter of a plurality of pores exposed to the surface was 0.04 µm, as the first layer and using silica particles having an average particle diameter D20 of 0.13 µm and an average particle diameter D90 of 2.48 µm as the inorganic particles that were mixed at the time of preparation of the coating material.

Example 2-3

A separator was prepared in the same manner as Example 2-1 except for using a polyethylene microporous membrane having a thickness of 12.0 µm, in which an average pore diameter of a plurality of pores exposed to the surface was 0.03 µm, as the first layer and using silica particles having an average particle diameter D20 of 0.13 µm and an average particle diameter D90 of 2.48 µm as the inorganic particles that were mixed at the time of preparation of the coating material.

Example 2-4

A separator was prepared in the same manner as Example 2-1 except for using a polyethylene microporous membrane, in which an average pore diameter of a plurality of pores exposed to the surface was 0.10 µm as the first layer and using silica particles having an average particle diameter D20 of 2.10 µm and an average particle diameter D90 of 5.00 µm as the inorganic particles that were mixed at the time of preparation of the coating material.

Example 2-5

A separator was prepared in the same manner as Example 2-1 except for using a polyethylene microporous membrane, in which an average pore diameter of a plurality of pores exposed to the surface was 0.50 µm, as the first layer and using silica particles having an average particle diameter D20 of 2.10 µm and an average particle diameter D90 of 5.00 µm as the inorganic particles that were mixed at the time of preparation of the coating material.

Example 2-6

A separator was prepared in the same manner as Example 2-1 except for using a polyethylene microporous membrane, in which an average pore diameter of a plurality of pores exposed to the surface was 1.50 µm, as the first layer and using silica particles having an average particle diameter D20 of 2.10 µm and an average particle diameter D90 of 5.00 µm as the inorganic particles that were mixed at the time of preparation of the coating material.

Example 2-7

A separator was prepared in the same manner as Example 2-1 except for using a polyethylene microporous membrane, in which an average pore diameter of a plurality of pores exposed to the surface was 2.00 µm, as the first layer and using silica particles having an average particle diameter D20 of 2.10 µm and an average particle diameter D90 of 5.00 µm as the inorganic particles that were mixed at the time of preparation of the coating material.

Comparative Example 2-1

A separator was prepared in the same manner as Example 2-1 except for using a polyethylene microporous membrane, in which an average pore diameter of a plurality of pores exposed to the surface was 0.01 µm, as the first layer and using silica particles having an average particle diameter D20 of 2.10 µm and an average particle diameter D90 of 5.00 µm as the inorganic particles that were mixed at the time of preparation of the coating material.

Comparative Example 2-2

A separator was prepared in the same manner as Example 2-1 except for using a polyethylene microporous membrane, in which an average pore diameter of a plurality of pores exposed to the surface was 2.20 µm, as the first layer and using silica particles having an average particle diameter D20 of 3.00 µm and an average particle diameter D90 of 5.00 µm as the inorganic particles that were mixed at the time of preparation of the coating material.

Evaluation

Similarly to Example 1, the following were calculated.

(a) Difference of Air Permeability of Separator

Difference of Air Permeability[sec/100 ml]=Air Permeability of First Layer-Air Permeability of Second Layer (b) Air Permeability Rising Rate of Separator Air Permeability Rising Rate[%]=(Air Permeability of Second Layer-Air Permeability of First Layer)/Air Permeability of First Layer (c) Capacity Maintaining Rate Capacity Maintaining Rate[%]=(Amount of Electricity Discharged at the 100th Cycle/First-Time Capacity)×100

In Table 2 shown below, the evaluation results are represented.

TABLE 2

| | First Layer | | | Second Layer | | | | | | |
|---|---|---|---|---|---|---|---|---|---|---|
| | Material | Thickness [μm] | Average Surface Pore Diameter [μm] | Resin Material | Inorganic Particle | Average Particle Diameter D20 [μm] | Average Particle Diameter D90 [μm] | Air Permeability Difference [Sec/100 ml] | Air Permeability Rising Rate [%] | Problem | Capacity Maintaining Rate |
| Example 2-1 | Polyethylene | 16.0 | 0.05 | PVdF | Alumina | 0.21 | 3.18 | 10 | 15 | — | ○ |
| Example 2-2 | Polyethylene | 9.0 | 0.04 | PVdF | Silica | 0.13 | 2.48 | 10 | 12 | — | ○ |
| Example 2-3 | Polyethylene | 12.0 | 0.03 | PVdF | Silica | 0.13 | 2.48 | 10 | 10 | — | ○ |
| Example 2-4 | Polyethylene | 16.0 | 0.10 | PVdF | Silica | 2.10 | 5.00 | 10 | 8 | — | ○ |
| Example 2-5 | Polyethylene | 16.0 | 0.50 | PVdF | Silica | 2.10 | 5.00 | 10 | 8 | — | ○ |
| Example 2-6 | Polyethylene | 16.0 | 1.50 | PVdF | Silica | 2.10 | 5.00 | 10 | 6 | — | ○ |
| Example 2-7 | Polyethylene | 16.0 | 2.00 | PVdF | Silica | 2.10 | 5.00 | 10 | 6 | — | ○ |
| Comparative Example 2-1 | Polyethylene | 16.0 | 0.01 | PVdF | Silica | 2.10 | 5.00 | 10 | 7 | — | X |
| Comparative Example 2-2 | Polyethylene | 16.0 | 2.20 | PVdF | Silica | 3.00 | 5.00 | 10 | 10 | Broken Separator | — |

In Table 2, a case where the capacity maintaining rate is equal to or greater than 80% is denoted by "o", and a case where the capacity maintaining rate is less than 80% is denoted by "x".

In Example 2, the separator, in which the second layer containing inorganic particles having the average particle diameter D20 larger than the average pore diameter of the pores of the surface of the first layer was formed, was employed. As is apparent from Table 2, in a case where the average pore diameter of the first layer is equal to or greater than 0.03 μm and equal to or less than 2.00 μm as in Examples 2-1 to 2-7, the capacity maintaining rate was equal to or greater than 80%.

In contrast, it was found that, in a case where the average pore diameter of the pores of the surface of the first layer was too small as being 0.01 μm, as in Comparative Example 2-1, the capacity maintaining rate was decreased regardless of the average particle diameter D20 of the inorganic particles contained in the second layer. In such a case, since the ion permeability is decreased regardless of clogging of the pores with inorganic particles, the battery capability was decreased. On the other hand, in a case where the average pore diameter of the pores of the surface of the first layer was too large as being 2.20 μm, as in Comparative Example 2-2, the strength of the first layer serving as a base member is remarkably decreased, whereby the separator was broken when the wound electrode body was prepared. In addition, since deposition of lithium dendrite occurs at the time of the charging process, even in a case where a cylinder-type battery could be prepared, a short circuit was formed due to the lithium dendrite.

From Example 2, it was found that the average pore diameter of the pores of the surface of the first layer is preferably equal to or greater than 0.03 μm and equal to or less than 2.0 μm.

Example 3

In Example 3, batteries were prepared by employing separators that were prepared by changing the mixed amount of the inorganic particles contained in the second layer, and the separators and the battery characteristics were evaluated.

Example 3-1

Preparation of Separator
Preparation of Coating Material

First, as the inorganic particles dispersed into a polyvinylidene fluoride (PVdF) resin, alumina particles having an average particle diameter D20 of 0.21 μm and an average particle diameter D90 of 3.18 μm were used, and the mixed amount of the alumina particles is adjusted to 95.0 vol % so as to be used as the coating material.

Coating Process

Next, both sides of the polyethylene microporous membrane (first layer) in which the average pore diameter of a plurality of pores exposed on the surface was 0.05 μm were coated in a table coater with the above-described coating material in a thickness of 16 μm. At this time, the coating material is adjusted such that the area density is 0.60 mg/cm2. Next, second layers containing the alumina particles were formed on both sides of the polyethylene microporous membrane as the first layer by performing phase separation through a water bath and then performing a drying process. As a result, a separator was acquired.

Example 3-2

A separator was prepared in the same manner as Example 3-1 except for configuring the mixed amount of the alumina particles to be 90.0 vol %.

Example 3-3

A separator was prepared in the same manner as Example 3-1 except for configuring the mixed amount of the alumina particles to be 82.0 vol %.

Example 3-4

A separator was prepared in the same manner as Example 3-1 except for configuring the mixed amount of the alumina particles to be 69.0 vol %.

Example 3-5

A separator was prepared in the same manner as Example 3-1 except for configuring the mixed amount of the alumina particles to be 60.0 vol %.

Example 3-6

A separator was prepared in the same manner as Example 3-1 except for using silica particles having an average particle diameter D20 of 0.80 μm and an average particle diameter D90 of 2.00 μm as the inorganic particles that were mixed at the time of preparation of the coating material.

Example 3-7

A separator was prepared in the same manner as Example 3-1 except for using silica particles having an average particle diameter D20 of 2.10 μm and an average particle diameter D90 of 5.00 μm as the inorganic particles that were mixed at the time of preparation of the coating material and configuring the mixed amount of the silica particles to be 90.0 vol %.

Comparative Example 3-1

A separator was prepared in the same manner as Example 3-1 except for configuring the mixed amount of the alumina particles to be 98.0 vol %.

Comparative Example 3-2

A separator was prepared in the same manner as Example 3-1 except for configuring the mixed amount of the alumina particles to be 50.0 vol %.
Evaluation
Similarly to Example 1, the following were calculated.
(a) Difference of Air Permeability of Separator Difference of Air Permeability[sec/100 ml]=Air Permeability of First Layer-Air Permeability of Second Layer (b) Air Permeability Rising Rate of Separator Air Permeability Rising Rate[%]=(Air Permeability of Second Layer-Air Permeability of First Layer)/Air Permeability of First Layer (c) Capacity Maintaining Rate Capacity Maintaining Rate[%]=(Amount of Electricity Discharged at the 100th Cycle/First-Time Capacity)×100

In Table 3 shown below, the evaluation results are represented.

greater than 60.0 vol % and equal to or less than 95.0 vol %, as in Examples 3-1 to 3-7, the capacity maintaining rate was equal to or greater than 80%.

In contrast, in a case where the mixed amount of the inorganic particles was too large, as in Comparative Example 3-1, peeling-off of the inorganic particles and the like occurred. On the other hand, in a case where the mixed amount of the inorganic particles was too small, as in Comparative Example 3-2, the amount of mixed resin (PVdF) increased. Accordingly, the resin broke into the pores from the surface of the first layer so as to clog the pores. Therefore, the air permeability rising rate of the separator become markedly high so as to decrease the ion permeability, whereby the capacity maintaining rate was decreased.

From Example 3, it was found that, preferably, the mixed amount of the inorganic particles in the second layer is equal to or greater than 60.0 vol % and equal to or less than 95.0 vol %.

Example 4

In Example 4, batteries were prepared by employing separators that were prepared by changing the thickness of the first layer, and the separators and the battery characteristics were evaluated.

Example 4-1

Preparation of Separator
Preparation of Coating Material

First, as the inorganic particles dispersed into a polyvinylidene fluoride (PVdF) resin, alumina particles having an average particle diameter D20 of 0.21 μm and an average particle diameter D90 of 3.18 μm were used, and the mixed amount of the alumina particles is adjusted to 90.0 vol % so as to be used as the coating material.
<Coating Process>

Next, both sides of the polyethylene microporous membrane (first layer) in which the average pore diameter of a plurality of pores exposed on the surface was 0.05 μm were

TABLE 3

| | First Layer | | Second Layer | | | | | Air | | | Capacity |
| | | | | | | | | Air Permeability | Permeability | | Maintaining |
| | Material | Thickness [μm] | Resin Material | Inorganic Particle | Average Particle Diameter D20 [μm] | Average Particle Diameter D90 [μm] | Particle Mixed Amount [Vol %] | Difference [Sec/100 ml] | Rising Rate [%] | Problem | Rate |
|---|---|---|---|---|---|---|---|---|---|---|---|
| Example 3-1 | Polyethylene | 16.0 | PVdF | Alumina | 0.21 | 3.18 | 95.0 | 10 | 10 | — | ○ |
| Example 3-2 | Polyethylene | 16.0 | PVdF | Alumina | 0.21 | 3.18 | 90.0 | 10 | 15 | — | ○ |
| Example 3-3 | Polyethylene | 16.0 | PVdF | Alumina | 0.21 | 3.18 | 82.0 | 10 | 18 | — | ○ |
| Example 3-4 | Polyethylene | 16.0 | PVdF | Alumina | 0.21 | 3.18 | 69.0 | 10 | 28 | — | ○ |
| Example 3-5 | Polyethylene | 16.0 | PVdF | Alumina | 0.21 | 3.18 | 60.0 | 10 | 35 | — | ○ |
| Example 3-6 | Polyethylene | 16.0 | PVdF | Silica | 0.80 | 2.00 | 95.0 | 10 | 10 | — | ○ |
| Example 3-7 | Polyethylene | 16.0 | PVdF | Silica | 2.10 | 5.00 | 90.0 | 10 | 8 | — | ○ |
| Comparative Example 3-1 | Polyethylene | 16.0 | PVdF | Alumina | 0.21 | 3.18 | 98.0 | — | — | Particle Peeling-Off | — |
| Comparative Example 3-2 | Polyethylene | 16.0 | PVdF | Alumina | 0.21 | 3.18 | 50.0 | 10 | 45 | — | X |

In Table 3, a case where the capacity maintaining rate is equal to or greater than 80% is denoted by "o", and a case where the capacity maintaining rate is less than 80% is denoted by "x".

As is apparent from Table 3, in a case where the mixed amount of the inorganic particles (alumina) is equal to or coated in a table coater with the above-described coating material in a thickness of 10 μm. At this time, the coating material is adjusted such that the area density is 0.60 mg/cm². Next, second layers containing the alumina particles were formed on both sides of the polyethylene microporous membrane as the first layer by performing phase separation through a water bath and then performing a drying process. As a result, a separator was acquired.

Example 4-2

A separator was prepared in the same manner as Example 4-1 except for configuring the thickness of the first layer to be 12.0 μm.

Example 4-3

A separator was prepared in the same manner as Example 4-1 except for configuring the thickness of the first layer to be 14.0 μm.

Example 4-4

A separator was prepared in the same manner as Example 4-1 except for configuring the thickness of the first layer to be 16.0 μm.

Example 4-5

A separator was prepared in the same manner as Example 4-1 except for configuring the thickness of the first layer to be 18.0 μm.

Example 4-6

A separator was prepared in the same manner as Example 4-1 except for configuring the thickness of the first layer to be 20.0 μm.

Example 4-7

A separator was prepared in the same manner as Example 4-1 except for configuring the thickness of the first layer to be 24.0 μm.

Example 4-8

A separator was prepared in the same manner as Example 4-1 except for configuring the thickness of the first layer to be 28.0 μm.

Comparative Example 4-1

A separator was prepared in the same manner as Example 4-1 except for configuring the thickness of the first layer to be 9.0 μm.

Comparative Example 4-2

A separator was prepared in the same manner as Example 4-1 except for configuring the thickness of the first layer to be 30.0 μm.

Comparative Example 4-3

A separator was prepared in the same manner as Example 4-1 except for configuring the thickness of the first layer to be 40.0 μm.

[Evaluation]
Similarly to Example 1, the following were calculated.
(a) Difference of Air Permeability of Separator Difference of Air Permeability[sec/100 ml]=Air Permeability of First Layer-Air Permeability of Second Layer (b) Air Permeability Rising Rate of Separator Air Permeability Rising Rate[%]=(Air Permeability of Second Layer-Air Permeability of First Layer)/Air Permeability of First Layer (c) Capacity Maintaining Rate Capacity Maintaining Rate[%]=(Amount of Electricity Discharged at the 100th Cycle/First-Time Capacity)×100

In Table 4 shown below, the evaluation results are represented.

TABLE 4

| | First Layer | | | Second Layer | | | | | | | |
|---|---|---|---|---|---|---|---|---|---|---|---|
| | Material | Thickness [μm] | Average Surface Pore Diameter [μm] | Resin Material | Inorganic Particle | Average Particle Diameter D20 [μm] | Average Particle Diameter D90 [μm] | Air Permeability Difference [Sec/100 ml] | Air Permeability Rising Rate [%] | Problem | Capacity Maintaining Rate |
| Example 4-1 | Polyethylene | 10.0 | 0.05 | PVdF | Alumina | 0.21 | 3.18 | 10 | 7 | — | ○ |
| Example 4-2 | Polyethylene | 12.0 | 0.05 | PVdF | Alumina | 0.21 | 3.18 | 10 | 8 | — | ○ |
| Example 4-3 | Polyethylene | 14.0 | 0.05 | PVdF | Alumina | 0.21 | 3.18 | 10 | 9 | — | ○ |
| Example 4-4 | Polyethylene | 16.0 | 0.05 | PVdF | Alumina | 0.21 | 3.18 | 10 | 10 | — | ○ |
| Example 4-5 | Polyethylene | 18.0 | 0.05 | PVdF | Alumina | 0.21 | 3.18 | 10 | 7 | — | ○ |
| Example 4-6 | Polyethylene | 20.0 | 0.05 | PVdF | Alumina | 0.21 | 3.18 | 10 | 8 | — | ○ |
| Example 4-7 | Polyethylene | 24.0 | 0.05 | PVdF | Alumina | 0.21 | 3.18 | 10 | 8 | — | ○ |
| Example 4-8 | Polyethylene | 28.0 | 0.05 | PVdF | Alumina | 0.21 | 3.18 | 10 | 7 | — | ○ |
| Comparative Example 4-1 | Polyethylene | 9.0 | 0.05 | PVdF | Alumina | 0.21 | 3.18 | — | — | Broken Separator | — |
| Comparative Example 4-2 | Polyethylene | 30.0 | 0.05 | PVdF | Alumina | 0.21 | 3.18 | 10 | 7 | Increase in Battery Component Diameter | — |
| Comparative Example 4-3 | Polyethylene | 34.0 | 0.05 | PVdF | Alumina | 0.21 | 3.18 | 10 | 7 | Increase in Battery Component Diameter | — |

In Table 4, a case where the capacity maintaining rate is equal to or greater than 80% is denoted by "o", and a case where the capacity maintaining rate is less than 80% is denoted by "x".

As is apparent from Table 4, in a case where a separator in which the thickness of the first layer was equal to or greater than 10.0 μm and less than 30.0 μm was employed, as in Examples 4-1 to 4-8, the capacity maintaining rate was equal to or greater than 80%.

In contrast, in a case where the thickness of the first layer was small as being 9.0 μm, as in Comparative Example 4-1, the strength of the separator was decreased, and the separator was broken. On the other hand, in a case where the thickness of the first layer is equal to or greater than 30.0 μm, as in Comparative Examples 4-2 and 4-3, the component diameter of a wound electrode body prepared by being wound was increased, and accordingly, it was difficult to insert the wound electrode body into the battery can.

From Example 4, it was found that, preferably, the thickness of the first layer was equal to or greater than 10.0 μm and less than 30.0 μm.

Example 5

In Example 5, batteries were prepared by employing separators that were prepared by changing the coating area density of the coating material at the time of formation of the second layer, and the separators and the battery characteristics were evaluated.

Example 5-1

Preparation of Separator
Preparation of Coating Material

First, as the inorganic particles dispersed into a polyvinylidene fluoride (PVdF) resin, alumina particles having an average particle diameter D20 of 0.21 μm and an average particle diameter D90 of 3.18 μm were used, and the mixed amount of the alumina particles is adjusted to 90.0 vol % so as to be used as the coating material.

<Coating Process>

Next, both sides of the polyethylene microporous membrane (first layer) in which the average pore diameter of a plurality of pores exposed on the surface was 0.05 μm were coated in a table coater with the above-described coating material in a thickness of 16 μm. At this time, the coating material is adjusted such that the area density is 0.20 mg/cm². Next, second layers containing the alumina particles were formed on both sides of the polyethylene microporous membrane as the first layer by performing phase separation through a water bath and then performing a drying process. As a result, a separator was acquired.

Example 5-2

A separator was prepared in the same manner as Example 5-1 except for adjusting the coating area density of the coating material to be 0.40 mg/cm².

Example 5-3

A separator was prepared in the same manner as Example 5-1 except for adjusting the coating area density of the coating material to be 0.60 mg/cm².

Example 5-4

A separator was prepared in the same manner as Example 5-1 except for adjusting the coating area density of the coating material to be 0.80 mg/cm².

Example 5-5

A separator was prepared in the same manner as Example 5-1 except for adjusting the coating area density of the coating material to be 1.80 mg/cm².

Example 5-6

A separator was prepared in the same manner as Example 5-1 except for adjusting the mixed amount of the silica particles to be 95.0 vol % and the coating area density of the coating material to be 0.60 mg/cm² by using the silica particles having an average particle diameter D20 of 0.80 μm and an average particle diameter D90 of 2.00 μm as the inorganic particles that were mixed at the time of preparation of the coating material.

Comparative Example 5-1

A separator was prepared in the same manner as Example 5-1 except for adjusting the coating area density of the coating material to be 0.10 mg/cm².

Comparative Example 5-2

A separator was prepared in the same manner as Example 5-1 except for adjusting the coating area density of the coating material to be 2.00 mg/cm².

Comparative Example 5-3

A separator was prepared in the same manner as Example 5-1 except for not disposing the second layer.

[Evaluation]
Similarly to Example 1, the following were calculated.
(a) Difference of Air Permeability of Separator Difference of Air Permeability[sec/100 ml]=Air Permeability of First Layer-Air Permeability of Second Layer (b) Air Permeability Rising Rate of Separator Air Permeability Rising Rate[%]=(Air Permeability of Second Layer-Air Permeability of First Layer)/Air Permeability of First Layer (c) Capacity Maintaining Rate Capacity Maintaining Rate[%]=(Amount of Electricity Discharged at the 100th Cycle/First-Time Capacity)×100

In Table 5 shown below, the evaluation results are represented.

TABLE 5

| | First Layer | | Second Layer | | | | | | | Capacity |
|---|---|---|---|---|---|---|---|---|---|---|
| | Material | Thickness [μm] | Resin Material | Inorganic Particle | Average Particle Diameter D20 [μm] | Average Particle Diameter D90 [μm] | Particle Mixed Amount [Vol %] | Coating Area Density [mg/cm²] | Air Permeability Rising Rate [%] | Problem | Maintaining Rate |
| Example 5-1 | Polyethylene | 16.0 | PVdF | Alumina | 0.21 | 3.18 | 90.0 | 0.20 | 23 | — | ○ |
| Example 5-2 | Polyethylene | 16.0 | PVdF | Alumina | 0.21 | 3.18 | 90.0 | 0.40 | 20 | — | ○ |
| Example 5-3 | Polyethylene | 16.0 | PVdF | Alumina | 0.21 | 3.18 | 90.0 | 0.60 | 15 | — | ○ |
| Example 5-4 | Polyethylene | 16.0 | PVdF | Alumina | 0.21 | 3.18 | 90.0 | 0.80 | 10 | — | ○ |
| Example 5-5 | Polyethylene | 16.0 | PVdF | Alumina | 0.21 | 3.18 | 90.0 | 1.80 | 8 | — | ○ |
| Example 5-6 | Polyethylene | 16.0 | PVdF | Silica | 0.80 | 2.00 | 95.0 | 0.60 | 10 | — | ○ |
| Comparative Example 5-1 | Polyethylene | 16.0 | PVdF | Alumina | 0.21 | 3.18 | 90.0 | 0.10 | — | Uneven Coating of Second Layer/ Broken Separator | — |
| Comparative Example 5-2 | Polyethylene | 16.0 | PVdF | Alumina | 0.21 | 3.18 | 90.0 | 2.00 | 8 | Increase in Battery Component Diameter | — |
| Comparative Example 5-3 | Polyethylene | 16.0 | — | — | — | — | — | — | 50 | — | X |

In Table 5, a case where the capacity maintaining rate is equal to or greater than 80% is denoted by "o", and a case where the capacity maintaining rate is less than 80% is denoted by "x".

As is apparent from Table 5, by adjusting the coating area density of the second layer to be equal to or greater than 0.20 mg/cm² and equal to or less than 1.80 mg/cm², as in Examples 5-1 to 5-6, in a case where the average pore diameter of the first layer was equal to or greater than 0.03 μm and equal to or less than 2.00 μm, the capacity maintaining rate was equal to or greater than 80%.

In contrast, as in Comparative Example 5-1, in a case where the coating area density of the second layer was low as being 0.10 mg/cm², coating unevenness or coating breaking of the second layer occurred. Accordingly, it was difficult to form a separator according to an. On the other hand, as in Comparative Example 5-2, in a case where the coating area density of the second layer was high as being 2.00 mg/cm², the component diameter of the wound electrode body, which was prepared by being wound, increased. Accordingly, it was difficult to insert the wound electrode body into the battery can. Also in Comparative Example 5-3 in which the second layer is not disposed, the capacity maintaining rate was decreased. The reason for this is thought to be a decrease in the ion permeability due to crushing of the holes of the polyethylene microporous membrane as the first layer, that is, the separator, which is caused by expansion of the electrode.

From Example 5, it was found that, preferably, the coating area density of the second layer with respect to the surface of the first layer was equal to or greater than 0.20 mg/cm² and equal to or lower than 1.8010 mg/cm².

Example 6

In Example 6, batteries were prepared by employing separators that were prepared by respectively changing the thickness of the first layer and the average particle diameter D90 of the inorganic particles mixed into the second layer, and the separators and the battery characteristics were evaluated.

Example 6-1

Preparation of Coating Material

First, as the inorganic particles dispersed into a polyvinylidene fluoride (PVdF) resin, alumina particles having an average particle diameter D20 of 0.21 μn and an average particle diameter D90 of 3.18 μm were used, and the mixed amount of the alumina particles is adjusted to 90.0 vol % so as to be used as the coating material.

<Coating Process>

Next, both sides of the polyethylene microporous membrane (first layer) in which the average pore diameter of a plurality of pores exposed on the surface was 0.05 μm were coated in a table coater with the above-described coating material in a thickness of 16 μm. At this time, the coating material is adjusted such that the area density is 0.60 mg/cm². Next, second layers containing the alumina particles were formed on both sides of the polyethylene microporous membrane as the first layer by performing phase separation through a water bath and then performing a drying process. As a result, a separator was acquired.

Example 6-2

A separator was prepared in the same manner as Example 6-1 except for configuring the thickness of the first layer to be 9.0 μm and an average pore diameter of the surface of the first layer to be 0.04 μm and using silica particles having an average particle diameter D20 of 0.13 μm and an average particle diameter D90 of 2.48 μm as the inorganic particles mixed into the second layer.

Example 6-3

A separator was prepared in the same manner as Example 6-1 except for configuring the thickness of the first layer to be 12.0 μm and an average pore diameter of the surface of the first layer to be 0.03 μm and using silica particles having an average particle diameter D20 of 0.13 μm and an average particle diameter D90 of 2.48 μm as the inorganic particles mixed into the second layer.

Example 6-4

A separator was prepared in the same manner as Example 6-1 except for configuring an average pore diameter of the surface of the first layer to be 1.50 µm and using silica particles having an average particle diameter D20 of 2.10 µm and an average particle diameter D90 of 5.00 µm as the inorganic particles mixed into the second layer.

Comparative Example 6-1

A separator was prepared in the same manner as Example 6-1 except for configuring the thickness of the first layer to be 9.0 µm.

Comparative Example 6-2

A separator was prepared in the same manner as Example 6-1 except for configuring the thickness of the first layer to be 9.0 µm and the average pore diameter to be 0.04 µm and using silica particles having an average particle diameter D20 of 1.00 µm and an average particle diameter D90 of 5.00 µm as the inorganic particles mixed into the second layer.

Comparative Example 6-3

A separator was prepared in the same manner as Example 6-1 except for configuring the thickness of the first layer to be 12.0 µm and the average pore diameter to be 0.03 µm and using silica particles having an average particle diameter D20 of 1.00 µm and an average particle diameter D90 of 5.00 µm as the inorganic particles mixed into the second layer.

[Evaluation]
Similarly to Example 1, the following were calculated.
(a) Difference of Air Permeability of Separator Difference of Air Permeability[sec/100 ml]=Air Permeability of First Layer-Air Permeability of Second Layer (b) Air Permeability Rising Rate of Separator Air Permeability Rising Rate[%]=(Air Permeability of Second Layer-Air Permeability of First Layer)/Air Permeability of First Layer (c) Capacity Maintaining Rate Capacity Maintaining Rate[%]=(Amount of Electricity Discharged at the 100th Cycle/First-Time Capacity)×100

In Table 6 shown below, the evaluation results are represented.

In Table 6, a case where the capacity maintaining rate is equal to or greater than 80% is denoted by "o", and a case where the capacity maintaining rate is less than 80% is denoted by "x".

As is apparent from Table 6, as in Examples 6-1 to 6-4, in a case where the average particle diameter D90 of the inorganic particles contained in the second layer was equal to or less than ⅓ of the thickness of the first layer, there was no inconvenience in preparing the wound electrode body, and the capacity maintaining rate was equal to or greater than 80%.

In contrast, in a case where the average particle diameter D90 of the inorganic particles contained in the second layer exceeds ⅓ of the thickness of the first layer, the inorganic particles of the second layer break through the first layer. Accordingly, the separator is broken. In addition, since the inorganic particles are too large, cobwebbing occurs, that is, a portion (a portion in which coating is not spread on the side of the inorganic particles) that is not coated with the coating material is formed at the time of formation of the second layer. Accordingly, it was difficult to prepare a separator according to an.

From Example 6, it was found that, preferably, the average particle diameter D90 of the inorganic particles is equal to or less than ⅓ of the thickness of the first layer.

The configurations, the shapes, the materials, and the numerical values described in the above-described embodiments are merely examples. Thus, as necessary, a configuration, a shape, a material, or a numerical value other than those may be used.

In addition, in the above-described embodiments, examples are applied to a lithium ion battery are represented. However, the embodiments are not limited to the type of battery, but may be applied to any battery that has a separator. For example, an embodiment can be applied to various batteries such as a nickel hydrogen battery, a lithium cadmium battery, a lithium-manganese dioxide battery, and a lithium-iron sulfide battery.

In addition, in the above-described embodiments, examples are applied to a battery having a winding structure have been described. However, the structure of the battery is not limited thereto. Thus, an embodiment can be applied to

TABLE 6

| | First Layer | | | Second Layer | | | | | | | |
|---|---|---|---|---|---|---|---|---|---|---|---|
| | Material | Thickness [µm] | Average Surface Pore Diameter [µm] | Resin Material | Inorganic Particle | Average Particle Diameter D20 [µm] | Average Particle Diameter D90 [µm] | Air Permeability Difference [Sec/100 ml] | Air Permeability Rising Rate [%] | Problem | Capacity Maintaining Rate |
| Example 6-1 | Polyethylene | 16.0 | 0.05 | PVdF | Alumina | 0.21 | 3.18 | 10 | 15 | — | ○ |
| Example 6-2 | Polyethylene | 9.0 | 0.04 | PVdF | Silica | 0.13 | 2.48 | 10 | 12 | — | ○ |
| Example 6-3 | Polyethylene | 12.0 | 0.03 | PVdF | Silica | 0.13 | 2.48 | 10 | 10 | — | ○ |
| Example 6-4 | Polyethylene | 16.0 | 1.50 | PVdF | Silica | 2.10 | 5.00 | 10 | 6 | — | ○ |
| Comparative Example 6-1 | Polyethylene | 9.0 | 0.05 | PVdF | Alumina | 0.21 | 3.18 | — | — | Broken Separator | — |
| Comparative Example 6-2 | Polyethylene | 9.0 | 0.04 | PVdF | Silica | 1.00 | 5.00 | — | — | Cobwebbing at Time of Coating/Broken Separator | — |
| Comparative Example 6-3 | Polyethylene | 12.0 | 0.03 | PVdF | Silica | 1.00 | 5.00 | — | — | Cobwebbing at Time of Coating | — | a battery having a structure in which a positive electrode and a negative electrode are folded, a structure in which the positive electrode and the negative electrode are overlapped, or the like.

In addition, in the above-described embodiments, examples are applied to a battery having a cylinder shape or a flat shape have been described. However, the shape of the battery is not limited thereto. Thus, an embodiment can be applied to a battery having a coin shape, a button shape, a corner shape, or the like.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A separator comprising:
a first resin layer having a first principal face and a second principal face; and
a second resin layer provided on at least one of the first principal face and the second principal face;
wherein the second resin layer includes inorganic particles, and a volume fraction of the inorganic particles in the second resin layer is equal to or greater than 60 vol % and equal to or lower than 90 vol %,
wherein an average particle diameter D20 of the inorganic particles is larger than an average pore diameter of pores opening onto a surface of the first resin layer, and the average pore diameter of the pores ranges from 0.03 µm to 0.10 µm,
wherein an average particle diameter D20 of the inorganic particles of the second resin layer ranges from 0.13 µm to 0.21 µm,
wherein the average particle diameter D90 of the inorganic particles of the second resin layer ranges from 2.00 µm to 5.00 µm and is greater than the average particle diameter D20,
wherein the second resin layer includes one or more of materials selected from the group consisting of polyvinylidene fluoride, polyhexafluoropropylene, polysiloxane, polyacrylic acid, polymethacrylate and nitrile butadiene rubber,
wherein a difference between air permeability of the separator and air permeability of the first layer is equal to or less than 60 sec/100 ml, and
wherein the second resin layer comprises fibrils having the average diameter of equal to or less than 1 µm.

2. The separator according to claim 1, wherein an air-permeability rising rate of air permeability at a time when pressure is applied to the separator for two minutes at 60° C. under 50 kgf/cm² with respect to air permeability before the pressure load is equal to or lower than 35%.

3. The separator according to claim 1, wherein an average membrane thickness of the first layer is equal to or greater than 10.0 µm and less than 30.0 µm.

4. The separator according to claim 1, wherein an average particle diameter D90 of the inorganic particles is equal to or less than 1/3 of the membrane thickness of the first layer.

5. The separator according to claim 1, wherein an area density per a unit area of the second resin layer is equal to or greater than 0.2 mg/cm² and equal to or less than 1.8 mg/cm².

6. A battery comprising:
a positive electrode;
a negative electrode;
an electrolyte; and
a separator,
wherein the separator includes
a first resin layer having a first principal face and a second principal face and
a second resin layer provided on at least one of the first principal face and the second principal face;
wherein the second resin layer includes inorganic particles, and a volume fraction of the inorganic particles in the second resin layer is equal to or greater than 60 vol % and equal to or lower than 90 vol %,
wherein an average particle diameter D20 of the inorganic particles is larger than an average pore diameter of pores opening onto a surface of the first resin layer, and the average pore diameter of the pores ranges from 0.03 µm to 0.10 µm,
wherein an average particle diameter D20 of the inorganic particles of the second resin layer ranges from 0.13 µm to 0.21 µm,
wherein the average particle diameter D90 of the inorganic particles of the second resin layer ranges from 2.00 µm to 5.00 µm and is greater than the average particle diameter D20,
wherein the second resin layer includes one or more of materials selected from the group consisting of polyvinylidene fluoride, polyhexafluoropropylene, polysiloxane, polyacrylic acid, polymethacrylate and nitrile butadiene rubber,
wherein a difference between air permeability of the separator and air permeability of the first layer is equal to or less than 60 sec/100 ml, and
wherein the second resin layer comprises fibrils having the average diameter of equal to or less than 1 µm.

7. The battery according to claim 6, wherein an open-circuit voltage in a fully-charged state is in the range of 4.2 V to 4.6 V.

8. The battery according to claim 6, wherein an air-permeability rising rate of air permeability at a time when pressure is applied to the separator for two minutes at 60° C. under 50 kgf/cm² with respect to air permeability before the pressure load to the separator is equal to or lower than 35%.

9. The battery according to claim 6, wherein the positive electrode, the negative electrode and the separator are stacked and wound to constitute a wound electrode body,
an outer end of the separator is exposed on the periphery of the wound electrode body.

10. The battery according to claim 9, wherein a lead is connected to at least one of outer ends of the positive electrode and the negative electrode.

11. The battery of claim 10, wherein at least one of outer and inner principal faces of a collector of the positive electrode or the negative electrode is exposed at the at least one of the outer ends of the positive electrode and the negative electrode and the lead is connected to the exposed portion of the collector.

12. The battery according to claim 6, wherein an area density per unit area of the second resin layer is equal to or greater than 0.2 mg/cm² and equal to or less than 1.8 mg/cm².

13. The separator according to claim 1, wherein the first resin layer includes a first resin having chemical stability that is mixed or copolymerized with polyethylene or polypropylene.

14. The separator according to claim 1, wherein the second polymer resin includes polyhexafluoropropylene.

15. The separator according to claim 1, wherein the second resin layers are formed on both of the first principal face and the second principal face of the first resin layer.

16. The separator according to claim 1, wherein the second resin layer has a fibrillated mesh-shaped structure with the inorganic particles being separately dispersed.

17. The separator according to claim 1, wherein the second resin layer includes one or more of materials selected from the group consisting of polysiloxane, polyvinyl alcohol, polyacrylic acid, styrene-butadiene rubber and nitrile butadiene rubber.

18. The separator according to claim 1, wherein the inorganic particles includes at least one of alumina, silica, zirconia and titania.

19. The battery according to claim 6, wherein the second resin layer includes one or more of materials selected from the group consisting of polysiloxane, polyvinyl alcohol, polyacrylic acid, styrene-butadiene rubber and nitrile butadiene rubber.

20. The battery according to claim 6, wherein the volume fraction of the inorganic particles in the second resin layer is 82 vol % or more.

21. The battery according to claim 6, wherein the inorganic particles includes at least one of alumina, silica, zirconia and titania.

22. An electronic apparatus comprising the battery according to claim 1.

23. The separator according to claim 1, wherein the average pore diameter of the pores ranges from 0.03 μm to 0.05 μm.

24. The battery according to claim 6, wherein the average pore diameter of the pores ranges from 0.03 μm to 0.05 μm.

* * * * *